(12) United States Patent
Ishidate et al.

(10) Patent No.: US 10,185,119 B2
(45) Date of Patent: Jan. 22, 2019

(54) OPTICAL SCANNING APPARATUS WITH REFLECTION MIRROR MOUNTED BY LEAF SPRINGS AND IMAGE FORMING APPARATUS THEROF

(71) Applicant: CANON KABUSHIKI KAISHA, Tokyo (JP)

(72) Inventors: Takehiro Ishidate, Tokyo (JP); Yuichiro Imai, Tokyo (JP); Yuta Okada, Moriya (JP); Daisuke Aruga, Abiko (JP); Yasuaki Otoguro, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/702,219

(22) Filed: Sep. 12, 2017

(65) Prior Publication Data

US 2018/0095241 A1    Apr. 5, 2018

(30) Foreign Application Priority Data

Sep. 30, 2016   (JP) .................. 2016-193934

(51) Int. Cl.
*G03G 15/04* (2006.01)
*G02B 7/182* (2006.01)
(Continued)

(52) U.S. Cl.
CPC .......... *G02B 7/1821* (2013.01); *G02B 7/182* (2013.01); *G02B 26/10* (2013.01); *G02B 26/12* (2013.01);
(Continued)

(58) Field of Classification Search
CPC .................................................... G02B 7/1821
(Continued)

(56) References Cited

U.S. PATENT DOCUMENTS 7,522,326 B1    4/2009  Otoguro .................. 347/256
7,684,099 B2    3/2010  Otoguro .................. 359/216.1
(Continued)

FOREIGN PATENT DOCUMENTS

JP      11352602 A    * 12/1999
JP      2001-215434     8/2001
JP      2008-191555     8/2008

OTHER PUBLICATIONS

U.S. Appl. No. 15/706,317, filed Sep. 15, 2017.
(Continued)

*Primary Examiner* — Quana M Grainger
(74) *Attorney, Agent, or Firm* — Venable LLP

(57) ABSTRACT

An optical scanning apparatus includes a light source, a deflecting unit, a reflection mirror, a casing, and first and second leaf springs. The casing includes first and second mirror supporting portions and a facing portion. The following relationship is satisfied: D2<L+W−D1. With respect to a longitudinal direction, L is a length of the reflection mirror, D1 is a longest distance between the first and second supporting portions, W is a contact width of the second supporting portion to the reflection mirror, and D2 is a distance between the facing portion and a closest position thereto of the first supporting portion. The first and second leaf springs urge the reflection mirror against the first and second mirror supporting portions, respectively. At least one of the first and second leaf springs is bonded to the reflection mirror with an adhesive.

24 Claims, 14 Drawing Sheets

(51) Int. Cl.
*G02B 26/12* (2006.01)
*G02B 26/10* (2006.01)

(52) U.S. Cl.
CPC ... *G03G 15/0409* (2013.01); *G03G 15/04036* (2013.01)

(58) Field of Classification Search
USPC .............................................................. 399/4
See application file for complete search history.

(56) References Cited

U.S. PATENT DOCUMENTS

| | | | |
|---|---|---|---|
| 7,830,574 B2 | 11/2010 | Nakatsu | 359/196.1 |
| 8,810,622 B2 | 8/2014 | Mamiya et al. | 347/242 |
| 8,917,305 B2 | 12/2014 | Nakahata et al. | 347/244 |
| 8,947,478 B2 | 2/2015 | Ishidate et al. | 347/137 |
| 9,086,645 B2 | 7/2015 | Otoguro et al. | G02B 26/125 |
| 9,195,063 B2 | 11/2015 | Ishidate et al. | G03G 15/04072 |
| 9,316,992 B2 | 4/2016 | Ishidate et al. | G03G 21/1666 |
| 9,400,444 B2 | 7/2016 | Sato et al. | G02B 26/121 |
| 9,493,014 B2 | 11/2016 | Aruga et al. | B41J 2/47 |
| 9,517,638 B2 | 12/2016 | Otoguro et al. | G03G 15/04072 |
| 9,720,207 B2 | 8/2017 | Otoguro et al. | G03G 2215/013 |
| 9,772,577 B2 | 9/2017 | Ishidate et al. | G03G 15/043 |
| 2006/0126148 A1* | 6/2006 | Ushio | G02B 7/1821 359/212.1 |
| 2008/0186555 A1 | 8/2008 | Nakatsu | 359/223 |
| 2014/0211288 A1* | 7/2014 | Ohta | G02B 7/182 359/205.1 |
| 2014/0267529 A1 | 9/2014 | Otoguro et al. | G02B 26/125 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/19 |

OTHER PUBLICATIONS

U.S. Appl. No. 15/720,644, filed Sep. 29, 2017.
U.S. Appl. No. 15/718,510, filed Sep. 28, 2017.
Extended European Search Report dated Feb. 1, 2018 in counterpart European Application No. 17190514.4.

* cited by examiner

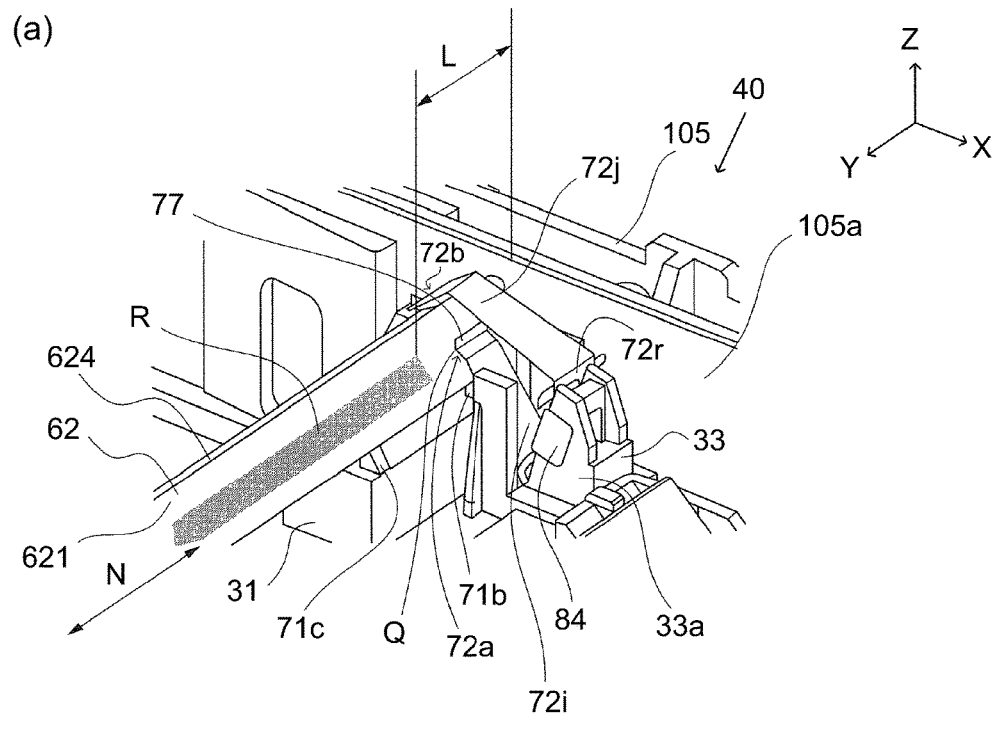
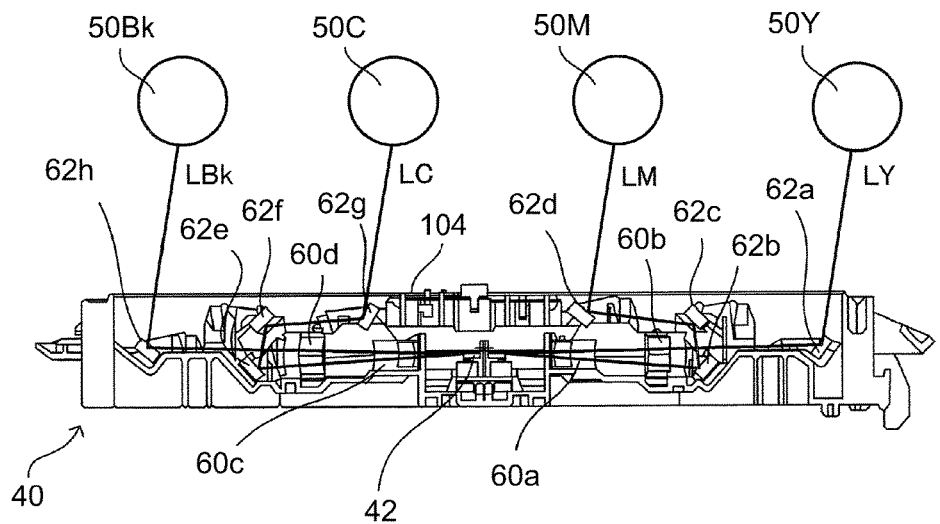
Fig. 2

OPTICAL SCANNING APPARATUS WITH REFLECTION MIRROR MOUNTED BY LEAF SPRINGS AND IMAGE FORMING APPARATUS THEROF

FIELD OF THE INVENTION AND RELATED ART

The present invention relates to an optical scanning apparatus for use with an image forming apparatus such as a copying machine, a printer, a facsimile machine or a multi-function machine having functions of these machines, and relates to the image forming apparatus including the optical scanning apparatus.

In the image forming apparatus, a rotatable polygonal mirror provided in the optical scanning apparatus is rotated and a direction of laser light is changed while scanning a photosensitive member with the laser light, so that a latent image is formed on the photosensitive member. In order to save an installation space and a cost of the mirror, the mirror is designed so that the mirror has an elongated shape and a small size to the extent possible.

The mirror is urged and supported by a mirror supporting portion provided in a casing of the optical scanning apparatus and is fixed to the casing. In general, as shown in part (a) of FIG. 13, mirror supporting bearing surfaces 70 and 71 are provided in the neighborhood of both end portions of a mirror 62 with respect to a longitudinal direction of the mirror. An elastic member 172 (part (c) of FIG. 13) employs a constitution such that the elastic member 172 is mounted at a position opposing the supporting bearing surfaces 70 and 71 through the mirror 62 and urges the mirror 62 toward the supporting bearing surfaces 70 and 71 (part (b) of FIG. 13). However, in such a constitution employed in general, there is a liability that the mirror 62 vibrates. In the image forming apparatus, in addition to the optical scanning apparatus, movable portions such as a sheet feeding roller, the photosensitive member, an intermediary transfer member, a fixing belt or roller, and the like and a driving system for driving these members are provided. When the driving system for these members is operated, vibration generating from the driving system is transmitted to the optical scanning apparatus, and thus there is a liability that the mirror 62 vibrates. When the mirror 62 vibrates, with the vibration of the mirror 62, a direction of reflected light of the laser light is changed. For that reason, an imaging (image forming) position of the laser light on the photosensitive member deviates from a desired position. As a result, non-uniformity such as a striped pattern generates on an image to be outputted.

In order to solve this problem, Japanese Laid-Open Patent Application 2001-215434 proposes a constitution in which a supporting bearing surface for supporting a surface, of a reflecting mirror, perpendicular to a reflecting surface of the reflecting mirror is movable in a longitudinal direction of the reflecting mirror. As a result, in a state in which the reflecting mirror is mounted in the casing, a natural frequency of the mirror can be deviated from a frequency of the movable portion of the image forming apparatus, so that resonance of the mirror can be suppressed.

However, there is a liability that the natural frequency of the mirror is changed after shipping of a product. The casing of the optical scanning apparatus is provided with abutting portions outside both ends of the mirror 62 with respect to the longitudinal direction of the mirror 62. For example, the casing of the optical scanning apparatus shown in FIG. 13 is provided with ribs 75 at both ends thereof. Each of the ribs 75 functions as a stopper for preventing the mirror 62 from disconnecting from the supporting bearing surface by movement of the mirror 62 due to transportation of the product during shipping or vibration of the production during installation. However, there is a liability that a value of the natural frequency of the mirror 62 is changed by contact of the mirror 62 to the rib 75 by movement of the mirror 62 in the longitudinal direction. As a result, there is a liability that the natural frequency unintentionally coincides with the frequency of the plurality of the driving systems, and thus not only the mirror largely vibrates but also image deterioration generates. Incidentally, a product such that a side wall of the casing of the optical scanning apparatus functions as a stopper also exists.

FIG. 14 is a graph showing a frequency (Hz) in the abscissa and acceleration (m/s$^2$) at central portion of the mirror with respect to the longitudinal direction in the ordinate. In FIG. 14, the graph in which the acceleration at the central portion of the member is measured while changing the frequency when an end portion 62t of the mirror 62 contacts the rib 75 of the casing is indicate by a broken line ("SIDE CONTACT"). In FIG. 14, the graph in which the acceleration at the central portion of the mirror is measured while changing the frequency when the end portion 62t of the mirror 62 does not contact the rib 75 of the casing is indicated by a solid line ("SIDE FREE"). As shown in FIG. 14, it is understood that the natural frequency is changed by 100 Hz or more due to a small difference between the case where the end portion 62t of the mirror 62 contacts the rib 75 of the casing and the case where the end portion 62t of the mirror 62 does not contact the rib 75 of the casing. In the case where in a vibration mode of the driving system of an image forming apparatus main assembly, there is a peak in the neighborhood of 450 Hz, there is a liability that by the contact of the mirror 62 to the rib 75, the mirror 6 resonates with the vibration of the image forming apparatus main assembly.

SUMMARY OF THE INVENTION

The present invention has been accomplished in the above-described circumstances, and a principal object of the present invention is to provide an optical scanning apparatus and an image forming apparatus, in which a natural frequency of an elongated reflecting mirror mounted in the optical scanning apparatus is stabilized by a simple constitution.

According to an aspect of the present invention, there is provided an optical scanning apparatus comprising: a light source configured to emit a light beam; a deflecting unit configured to deflect the light beam so that a photosensitive member is scanned with the light beam emitted from the light source; a reflection mirror configured to guide the light beam, onto the photosensitive member, deflected by the deflecting unit; and a casing configured to accommodate the deflecting unit and the reflection mirror; and first and second leaf springs, wherein the casing includes a first mirror supporting portion configured to support the reflection mirror in one end side, a second mirror supporting portion configured to support the reflection mirror in the other end side with respect to a longitudinal direction of the reflection mirror, and a facing portion configured to face a side end portion of the reflection mirror in said one end side, wherein the following relationship is satisfied:

$$D2 < L + W - D1,$$

where with respect to the longitudinal direction, L is a length of the reflection mirror, D1 is a longest distance of distances between a contact portion of the first supporting portion to the reflection mirror and a contact portion of the second supporting portion to the reflection mirror, W is a contact width of the second supporting portion to the reflection mirror, and D2 is a distance between the facing portion and a position, closest to the facing portion, of the contact portion of the first supporting portion to the reflection mirror, wherein the first leaf spring urges the reflection mirror in an elastically deformed state in said one end side so as to urge the reflection mirror against the first mirror supporting portion, wherein the second leaf spring urges the reflection mirror in an elastically deformed state in said the other side so as to urge the reflection mirror against the second mirror supporting portion, and wherein at least one of the first and second leaf springs is bonded to the reflection mirror with an adhesive.

According to another aspect of the present invention, there is provided an optical scanning apparatus comprising: a light source configured to emit a light beam; a deflecting unit configured to deflect the light beam so that a photosensitive member is scanned with the light beam emitted from the light source; a reflection mirror configured to guide the light beam, onto the photosensitive member, deflected by the deflecting unit; and a casing configured to accommodate the deflecting unit and the reflection mirror; and first and second leaf springs, wherein the casing includes a first mirror supporting portion configured to support the reflection mirror in one end side, a second mirror supporting portion configured to support the reflection mirror in the other end side with respect to a longitudinal direction of the reflection mirror, a first facing portion configured to face a side end portion of the reflection mirror in said one end side, and a second facing portion configured to face a side end portion of the reflecting mirror in said the other end side, wherein the following relationships are satisfied:

$D2 < L + W2 - D1$, $D3 < L + W1 - D1$, and $D1 + D2 + D3 > L$ where with respect to the longitudinal direction, L is a length of the reflection mirror, D1 is a longest distance of distances between a contact portion of the first supporting portion to the reflection mirror and a contact portion of the second supporting portion to the reflection mirror, W1 is a contact width of the first supporting portion to the reflecting mirror, W2 is a contact width of the second supporting portion to the reflection mirror, D2 is a distance between the first facing portion and a position, closest to the first facing portion, of the contact portion of the first supporting portion to the reflection mirror, and D3 is a distance between the second facing portion and a position, closest to the second facing portion, of the contact portion of the second supporting portion to the reflecting mirror, wherein the first leaf spring urges the reflection mirror in an elastically deformed state in said one end side so as to urge the reflection mirror against the first mirror supporting portion, wherein the second leaf spring urges the reflection mirror in an elastically deformed state in said the other side so as to urge the reflection mirror against the second mirror supporting portion, and wherein at least one of the first and second leaf springs is bonded to the reflection mirror with an adhesive.

According to a further aspect of the present invention, there is provided an image forming apparatus comprising: a photosensitive member, one of the above-described two optical scanning apparatuses configured to form a latent image on the photosensitive member; a developing portion (unit) configured to develop, with toner, the latent image formed by the optical scanning apparatus thereby to form a toner image; and a transfer portion (unit) configured to transfer the toner image, formed by the developing portion, onto a toner image receiving member.

Further features of the present invention will become apparent from the following description of exemplary embodiments with reference to the attached drawings.

Parts (a) and (b) of FIG. 2 are schematic views showing an end portion of a mirror in Embodiment 1, and an arrangement of optical members and an optical path of laser light in Embodiments 1 and 2, respectively.

Figure 3:
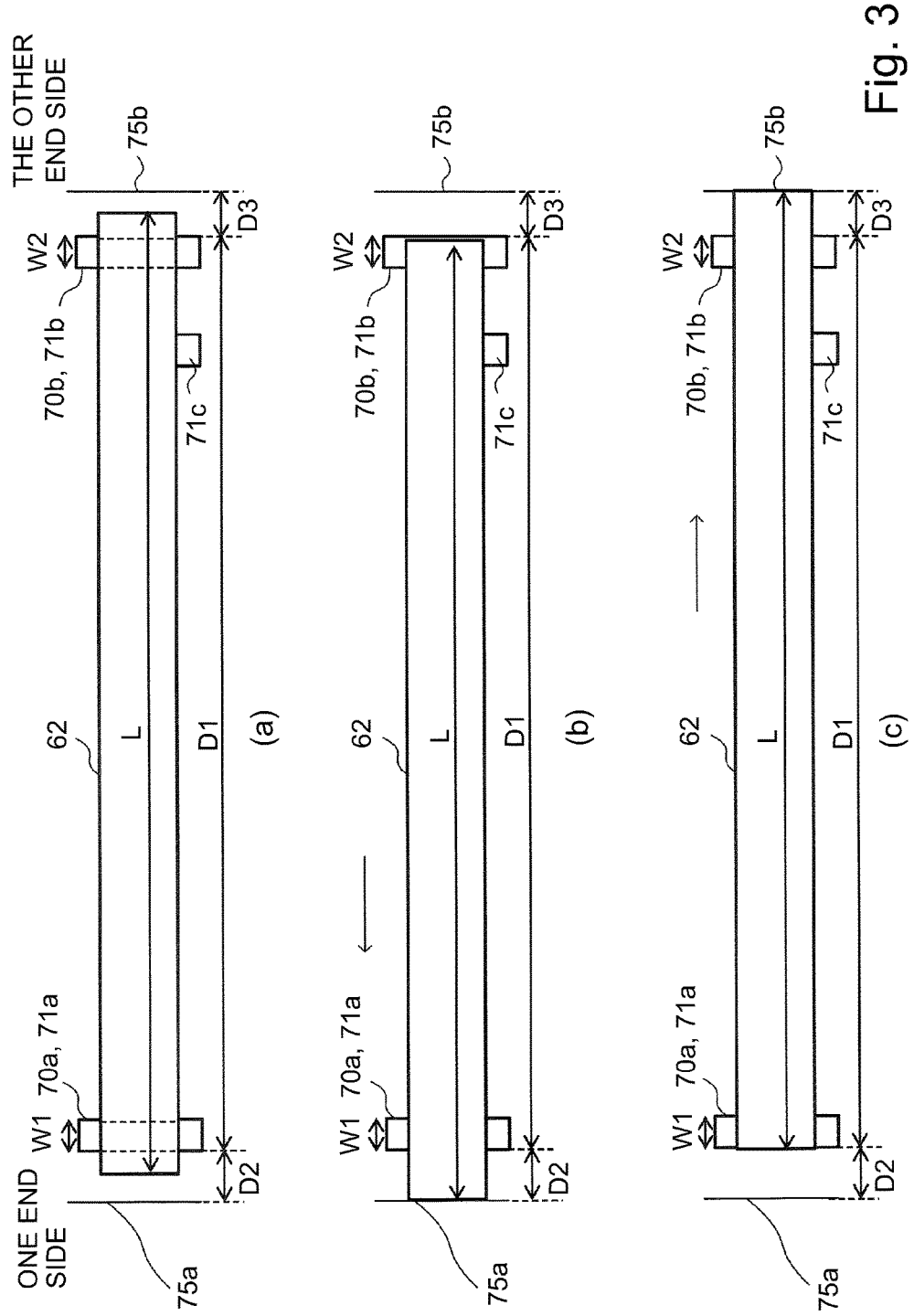

Parts (a), (b) and (c) of FIG. 3 are schematic views each for illustrating a relationship among a member, supporting bearing surfaces and ribs in Embodiment 1.

Figure 4:
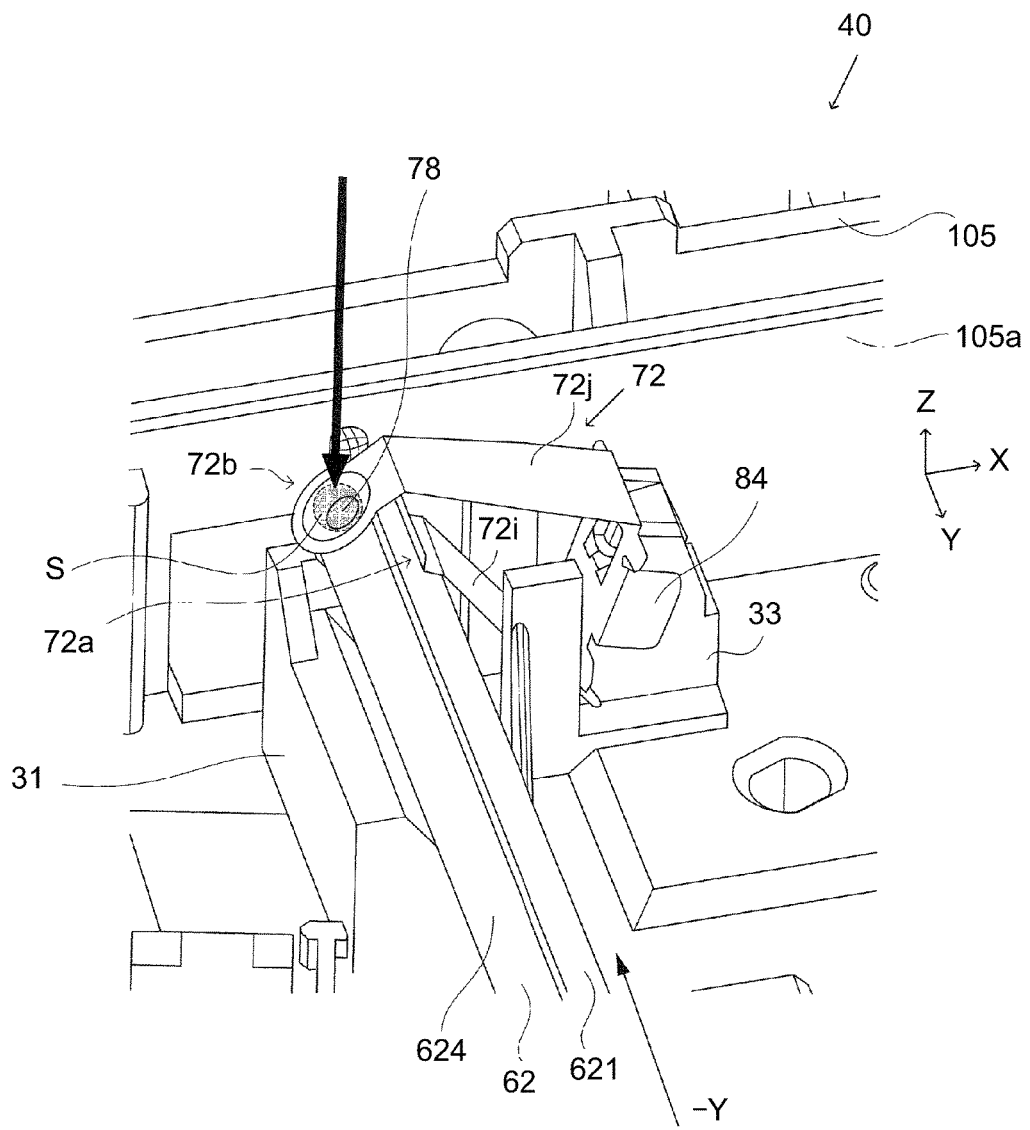

FIG. 4 is a schematic view for illustrating a bonding method between the mirror and an elastic member in Embodiment 1.

Figure 5:
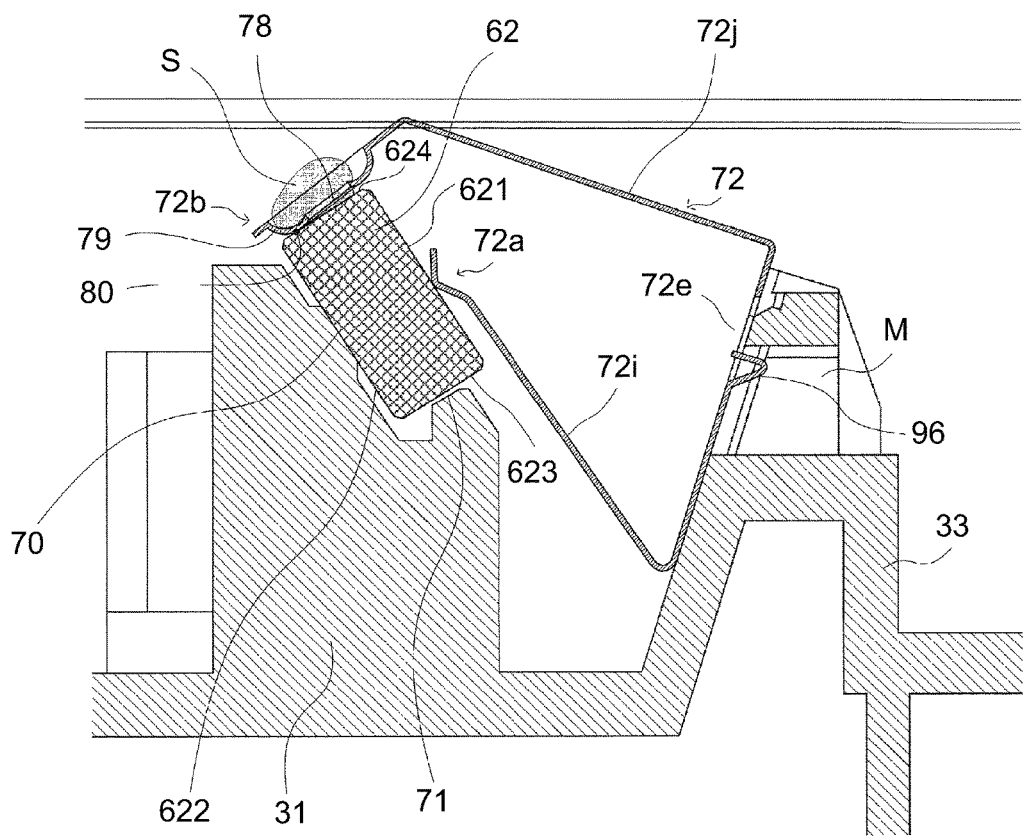

FIG. 5 is a sectional view for illustrating the bonding method between the mirror and the elastic member in Embodiment 1.

Figure 6:
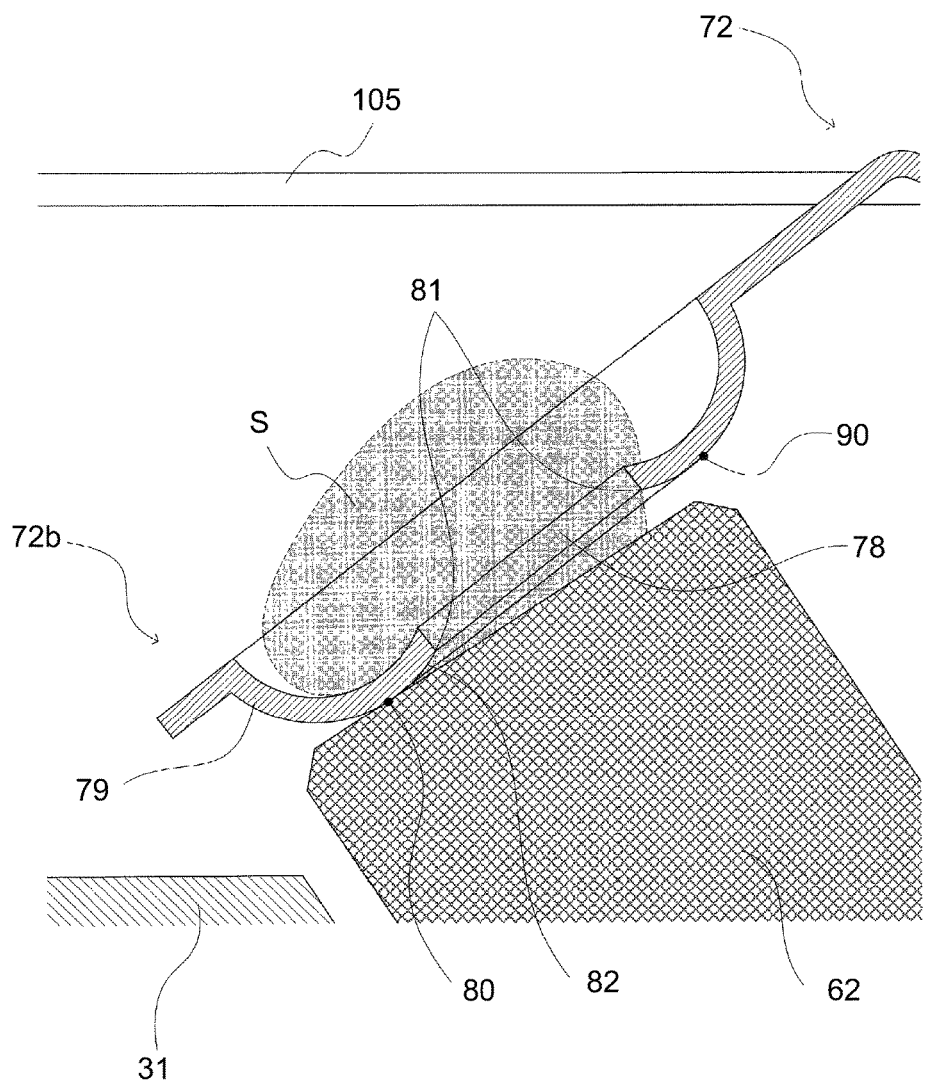

FIG. 6 is an enlarged view of a second urging portion of the elastic member in Embodiment 1.

Figure 7:
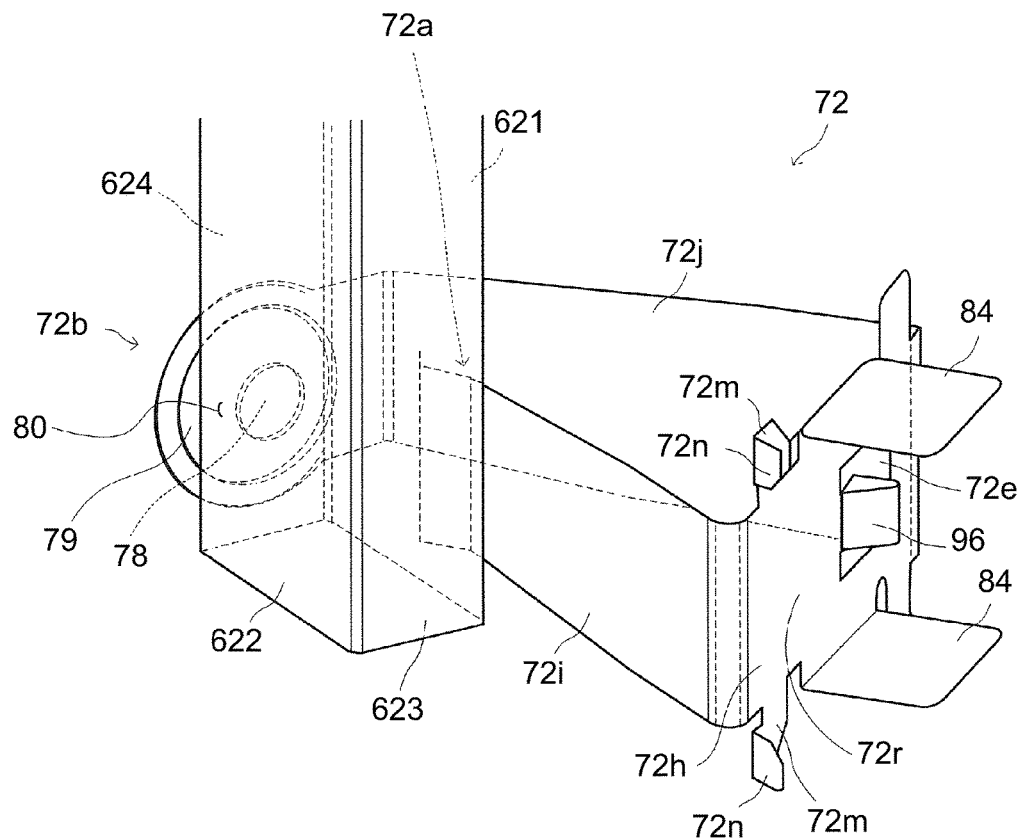

FIG. 7 is a schematic view of the mirror and the elastic member in Embodiment 1 as seen from a back side.

Figure 8:
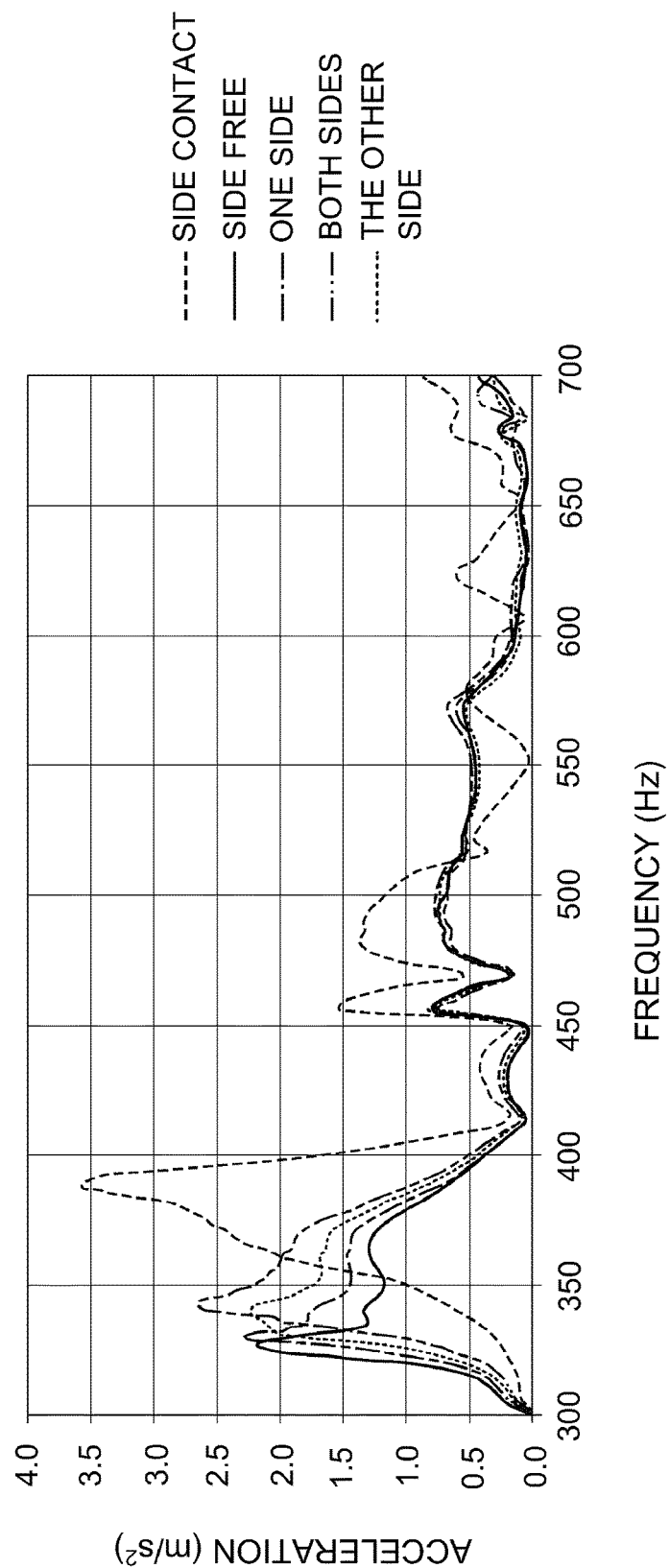

FIG. 8 is a graph for checking a change in natural frequency in Embodiment 1.

Figure 9:
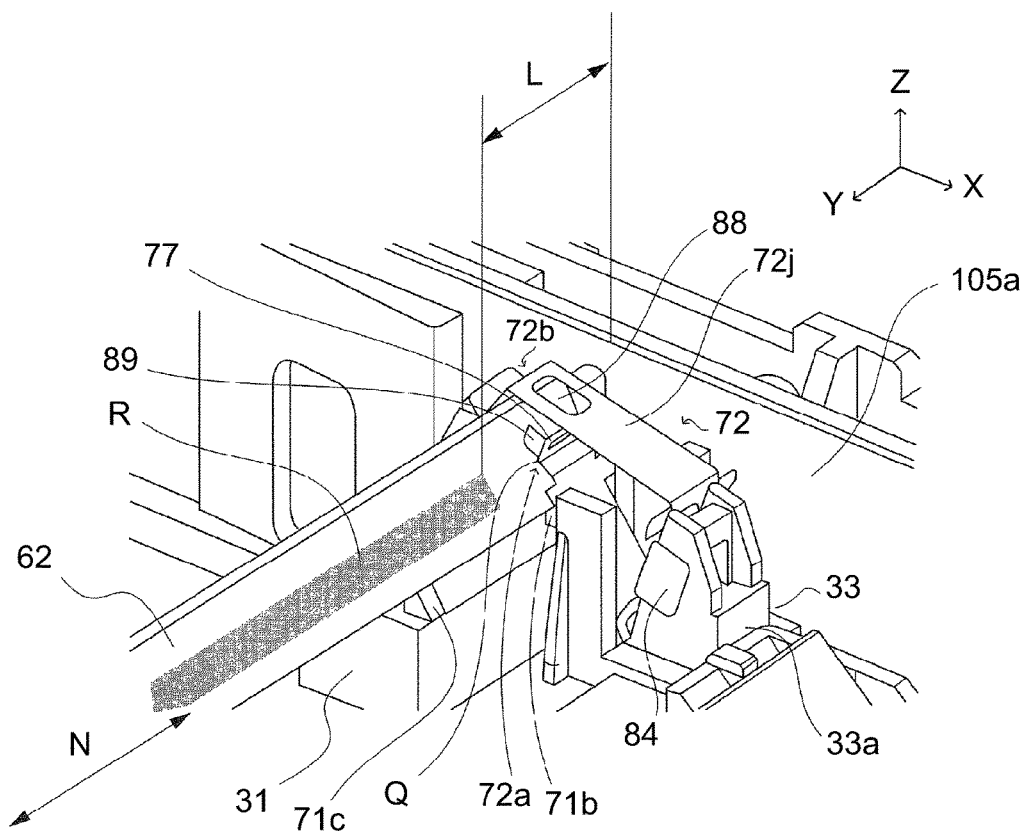

FIG. 9 is a schematic view showing an end portion of a mirror in Embodiment 2.

Figure 10:
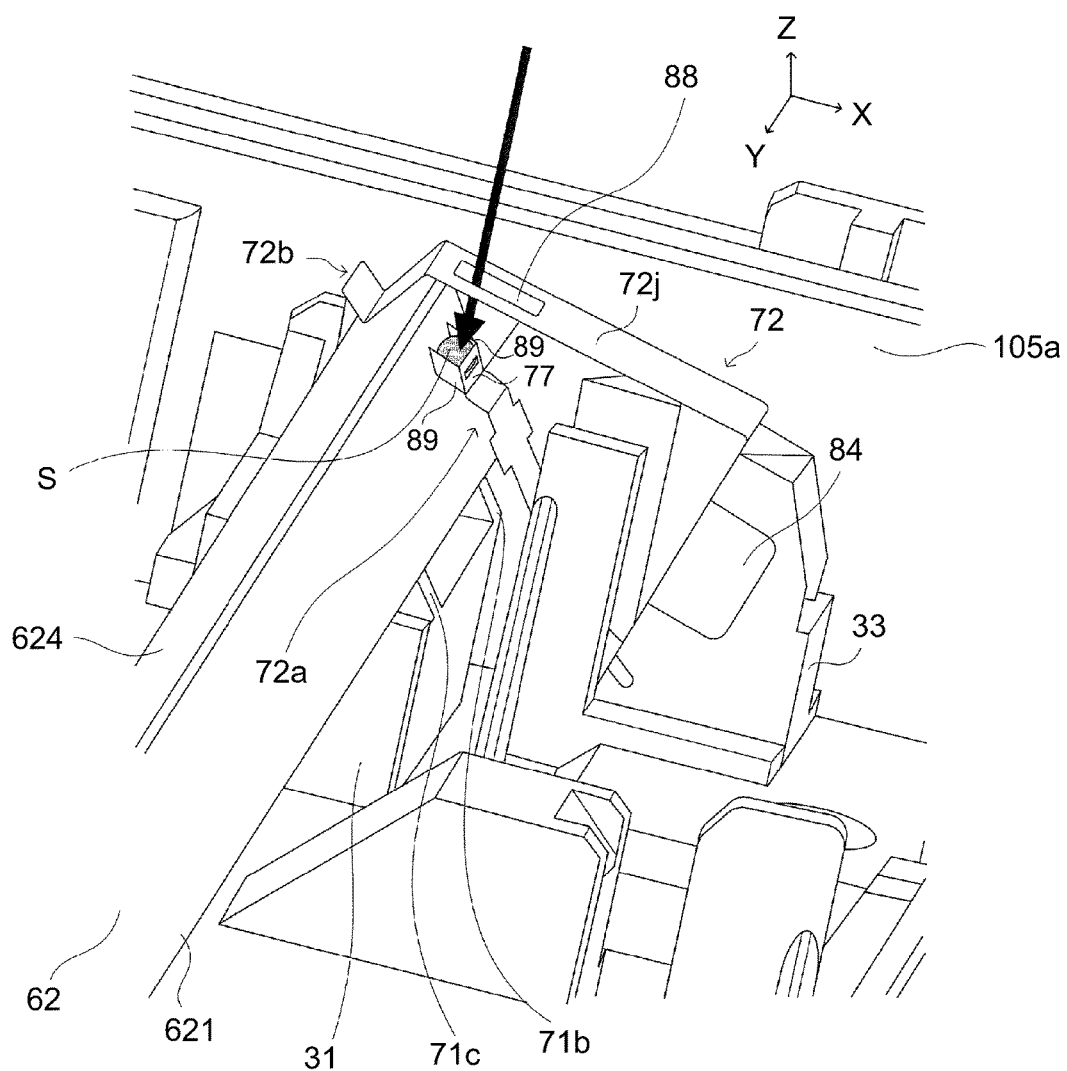

FIG. 10 is a schematic view for illustrating the mirror and an elastic member in Embodiment 2.

Figure 11:
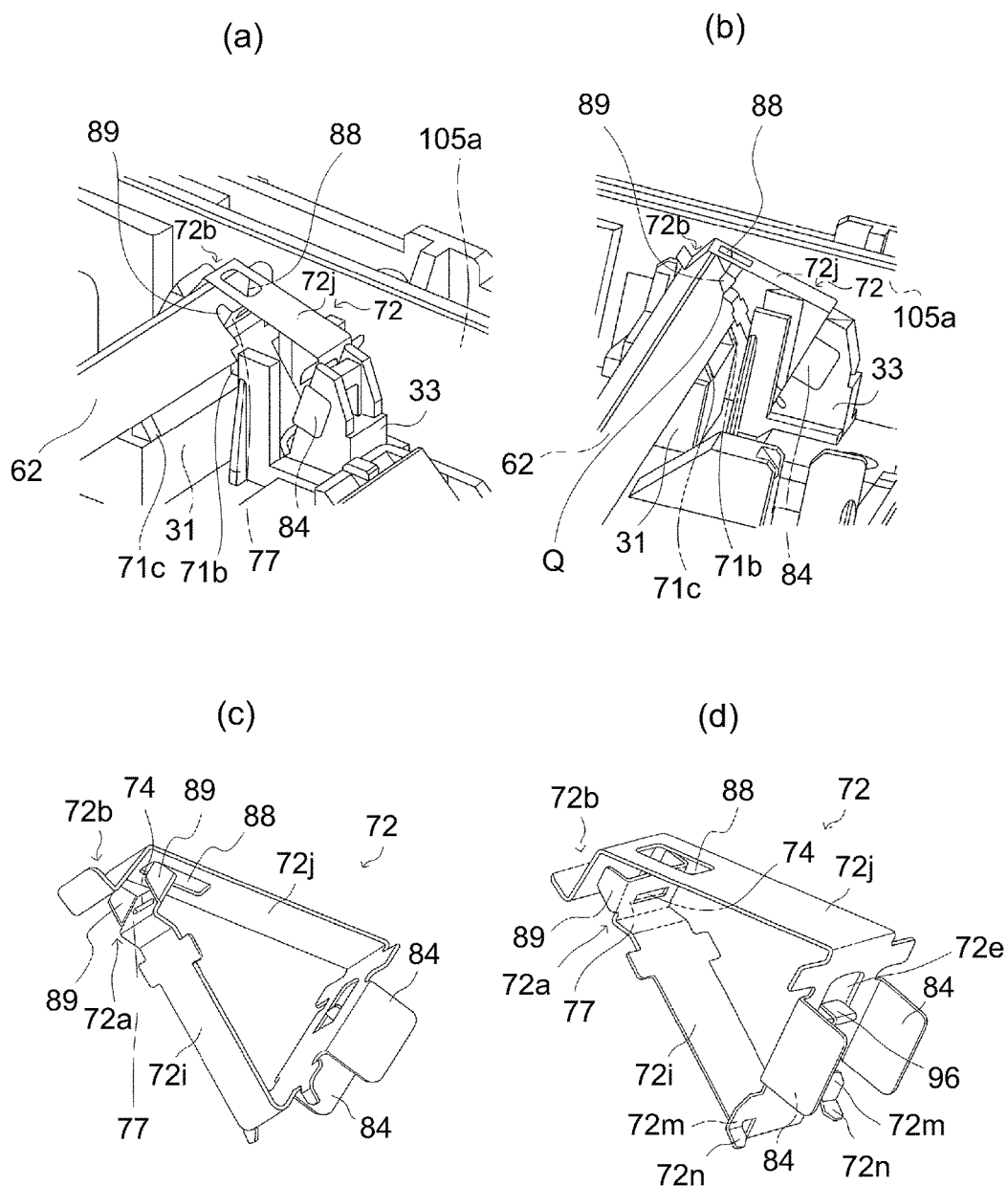

Parts (a) to (d) of FIG. 11 are schematic views each showing a constitution of the elastic member in Embodiment 2.

Figure 12:
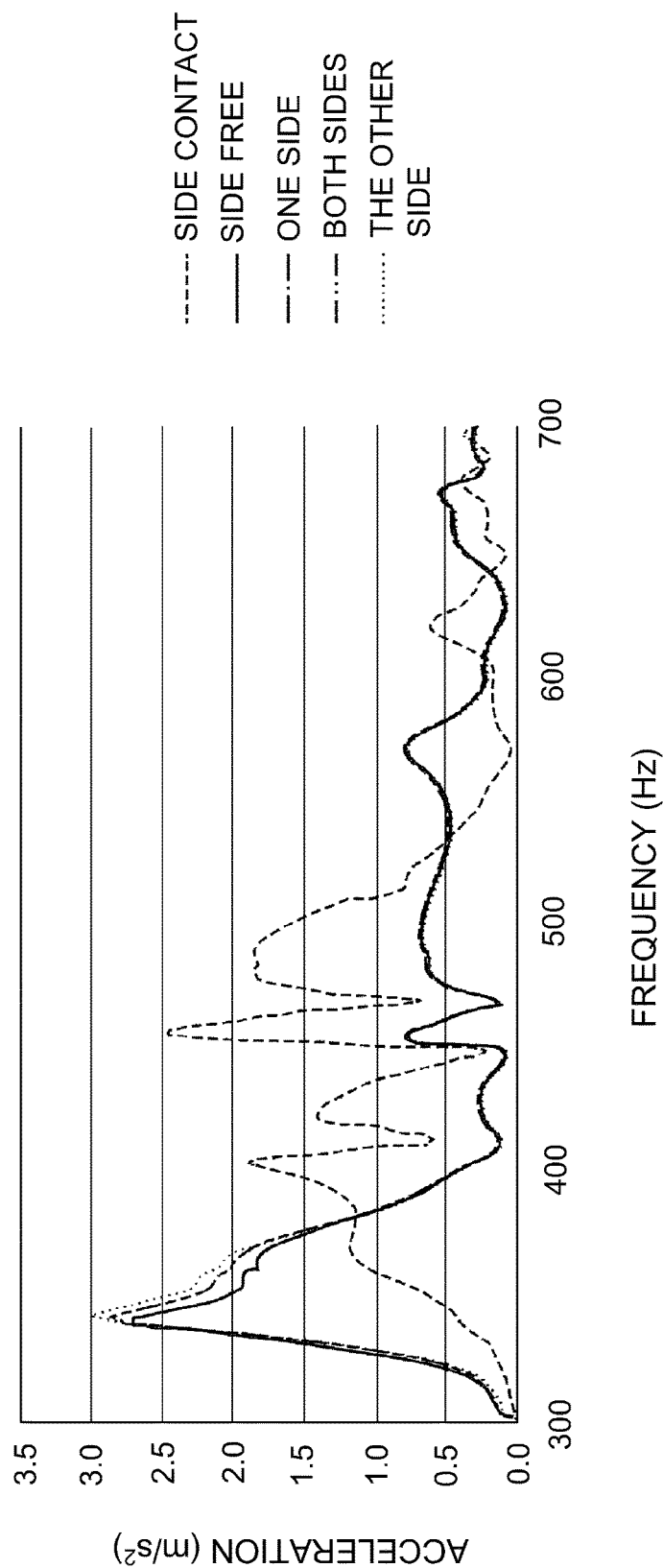

FIG. 12 is a graph for checking a change in natural frequency in Embodiment 1.

Figure 13:
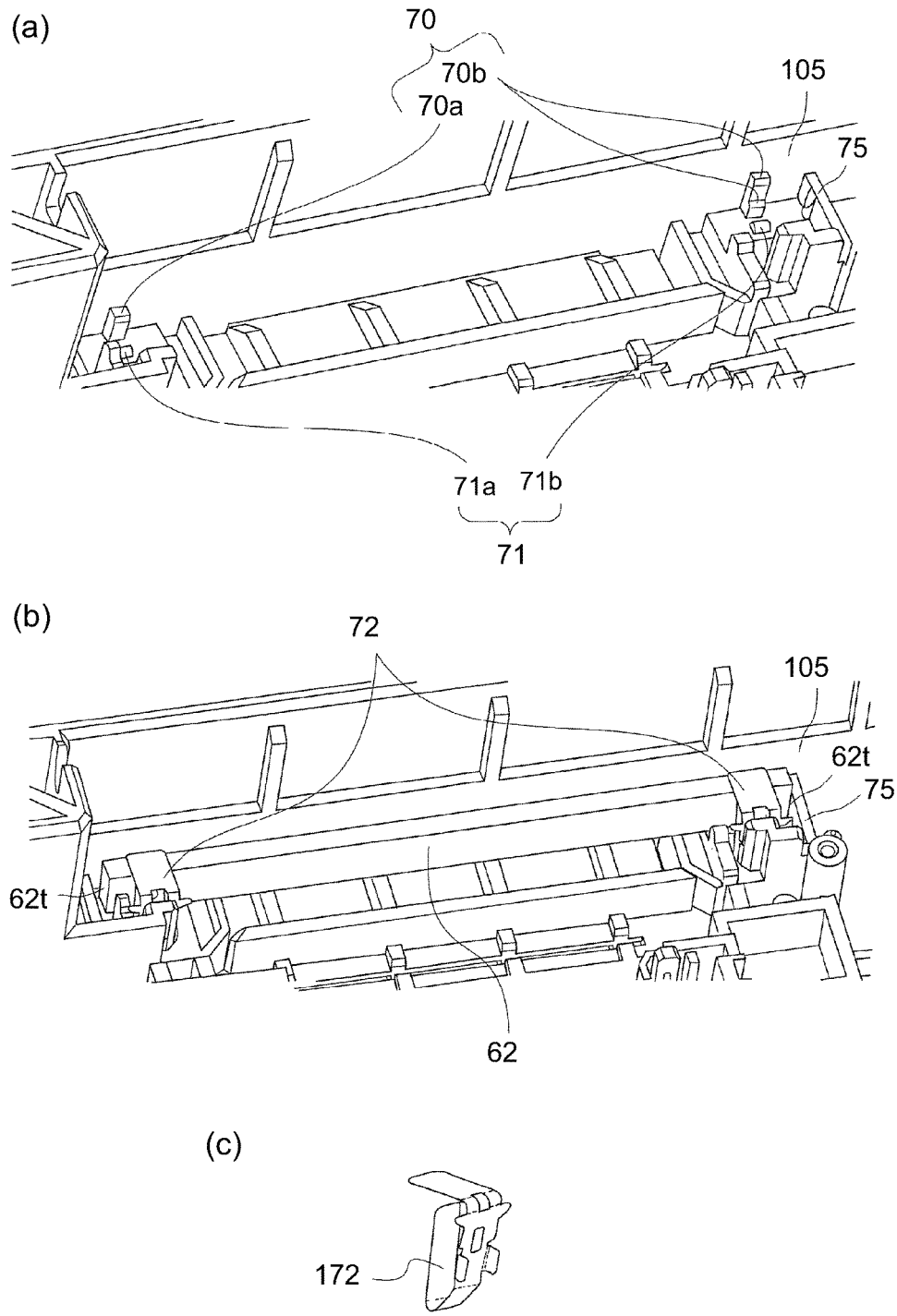

Parts (a), (b) and (c) of FIG. 13 are schematic views for illustrating a supporting bearing surface of a mirror in a conventional example.

Figure 14:
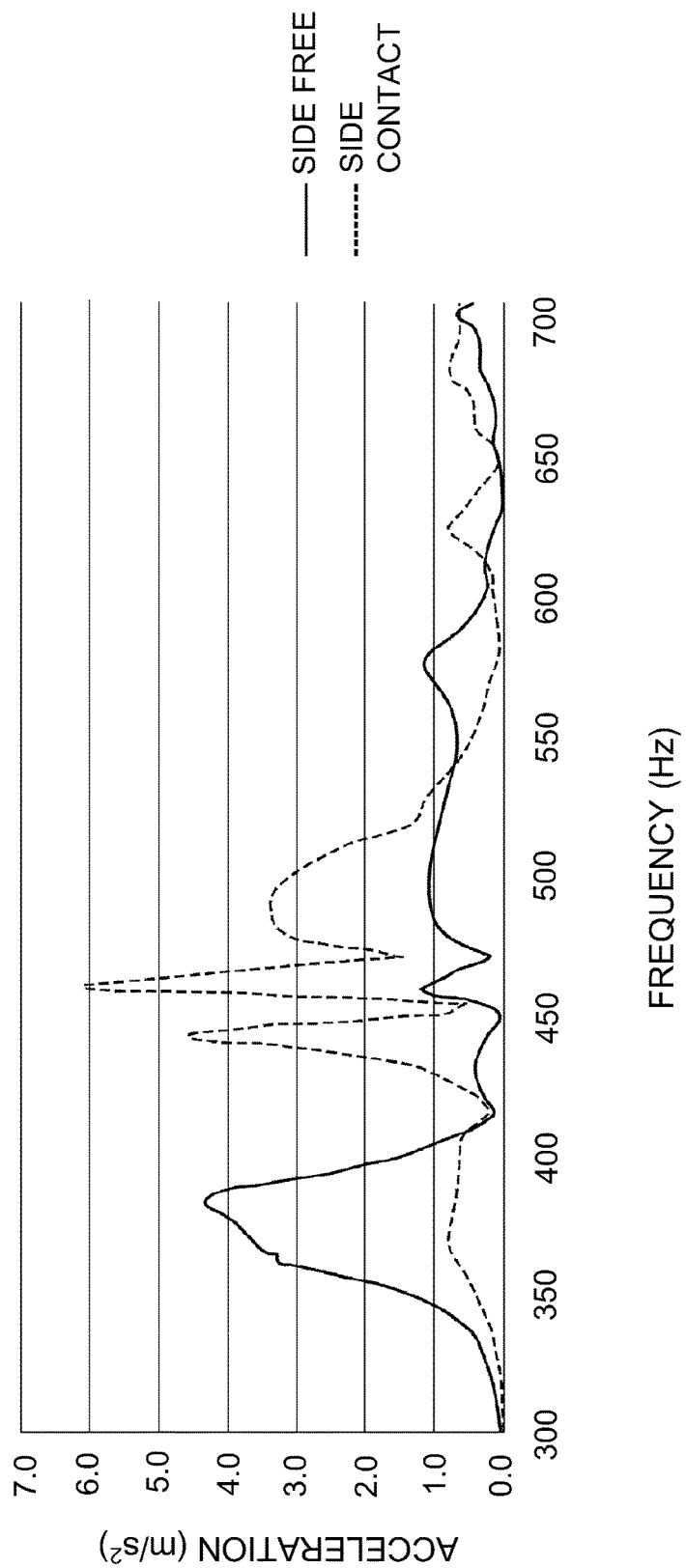

FIG. 14 is a graph showing a change in natural frequency during side free and during side contact in the conventional example.

DESCRIPTION OF EMBODIMENTS

Embodiments for carrying out the present invention will be specifically described with reference to the drawings. In the following description, a rotational axis direction of a rotatable polygonal mirror is Z-axis direction, a main scan direction as a scanning direction of a light beam or a longitudinal direction of a mirror is Y-axis direction, and a direction perpendicular to the Y-axis direction and the Z-axis direction is X-axis direction.

[Embodiment 1]

[Structure of Image Forming Apparatus]

Figure 1:
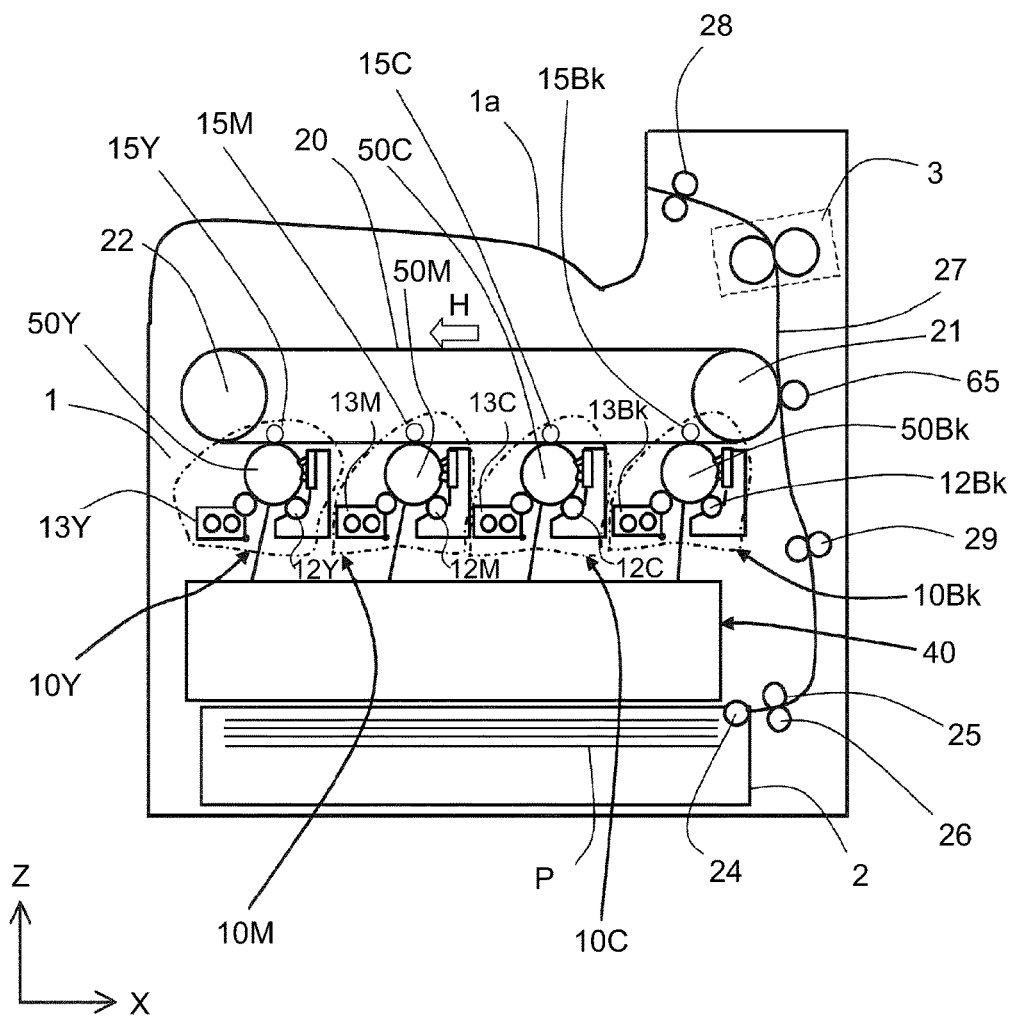
FIG. 1 is a schematic view showing a structure of an image forming apparatus in Embodiments 1 and 2.

A structure (constitution) of an image forming apparatus in Embodiment 1 will be described. FIG. 1 is a schematic view showing a general structure of a color laser beam printer of a tandem type (hereinafter simply referred to as a printer) in this embodiment. The printer includes four image forming engines 10Y, 10M, 10C and 10Bk (indicated by chain lines) for forming toner images of colors of yellow (Y), magenta (M), cyan (C) and black (Bk), respectively. The printer further includes an intermediary transfer belt 20 which is a toner image receiving member onto which the toner images are transferred from the engines 10Y, 10M, 10C and 10Bk. The toner images transferred superposedly onto the intermediary transfer belt 20 are constituted so that a full-color image is formed on a recording sheet S as a recording material or medium by being transferred onto the recording sheet S. In the following, symbols Y, M, C and Bk for representing the associated colors will be omitted except for necessary cases.

The intermediary transfer belt 20 is formed in an endless shape and is extended around a pair of belt feeding rollers 21 and 22, and is constituted so that the toner images formed by the respective image forming engines 10 are transferred onto the intermediary transfer belt 20 while being operated and rotated in an arrow H direction. Further, at a position opposing the belt feeding roller 21 through the intermediary transfer belt 20, a secondary transfer roller 65 is provided.

The recording sheet S is inserted between the secondary transfer roller 65 and the intermediary transfer belt 20 which are press-contacted to each other, so that the toner images are transferred from the intermediary transfer belt 20 onto the recording sheet S. In a lower side of the intermediary transfer belt 20, the above-described four image forming engines 10Y, 10M, 10C and 10Bk are disposed in parallel to each other, so that the toner images formed depending on respective pieces of color image information. These four image forming engines 10 are disposed along a rotational direction (arrow H direction) of the intermediary transfer belt 20 in the order of the image forming engines 10Y for yellow, 10M for magenta, 10C for cyan and 10Bk for black.

Below the image forming engines 10, an optical scanning apparatus 40 for exposing, to light depending on the associated image information, each of photosensitive drums (photosensitive members) 50 which are members-to-be-scanned provided in the respective image forming engines 10 is provided. The optical scanning apparatus 40 is common to all of the image forming engines and includes four semiconductor lasers which emit laser beams (light beams) modulated depending on the respective pieces of color image information and which are unshown light sources. The optical scanning apparatus 40 includes a rotatable polygonal mirror unit (hereinafter referred to as a deflector) 41 which rotates at high speed and which scans the photosensitive drums 50 in four optical paths with the light beams along rotational axis directions of the photosensitive drums 50 (part (b) of FIG. 2). The respective light beams with which the photosensitive drums 50 are scanned by the deflector 41 and advance along predetermined paths while being guided by optical members provided in the optical scanning apparatus 40. Then, the respective photosensitive drums 50 of the image forming engines 10 are exposed to the light beams through irradiation openings (not shown) provided at an upper portion of the optical scanning apparatus 40.

Further, each of the respective image forming engines 10 includes the photosensitive drum 50 and a charging roller 12 for electrically charging the photosensitive drum 50 to a uniform background portion potential. Each of the image forming engines 10 includes a developing device 13 for forming the toner image by developing, with the toner, an electrostatic latent image formed on the photosensitive drum 50 (member-to-be-scanned) by the exposure to the light beam. The developing device 13 forms the toner image depending on the associated color image information on the photosensitive drum 50 which is the photosensitive member. In order to omit maintenance for replacing the developer with a change with time, the developing device 13 is supplied with a developer, in which toner and a carrier are mixed, from a supplying cartridge (not shown). As regards the developing device 13, a developing type in which a deteriorated developer is automatically discharged is used.

At a position opposing the photosensitive drum 50 of the associated one of the image forming engines 10, a primary transfer roller 15 is provided so as to sandwich the intermediary transfer belt 20 between itself and the photosensitive drum 50. A predetermined transfer voltage is applied to the primary transfer roller 15, so that the toner image is transferred from the photosensitive drum 50 onto the intermediary transfer belt 20.

On the other hand, the recording sheet P is supplied from a sheet feeding cassette 2 accommodated at a lower portion of a printer casing 1 to an inside of the printer, specifically a secondary transfer position where the intermediary transfer belt 20 and the secondary transfer roller 65 are in contact with each other. At an upper portion of the sheet feeding cassette 2, a pick-up roller 24 and a sheet feeding roller 25 are provided adjacently to each other. Further, at a position opposing the sheet feeding roller 25, a retard roller 26 for preventing double feeding of the recording sheets P is provided. A feeding path 27 of the recording sheet P in the printer is provided substantially vertically along a side surface of the printer casing 1. The recording sheet P pulled-out from the sheet feeding cassette 2 positioned at the bottom of the printer casing 1 moves upward in the feeding path 27 and is sent to a registration roller pair 29 for controlling an entering timing of the recording sheet P into the secondary transfer position. Thereafter, the recording sheet P is, after the toner image is transferred at the secondary transfer position, sent to a fixing device 3 (indicated by a broken line in FIG. 1) provided in a downstream side of a recording sheet feeding direction. Then, the recording sheet P on which the toner image is fixed by the fixing device 3 passes through a discharging roller 28 and is discharged onto a discharge tray 1a provided at an upper surface of the printer casing 1.

For full-color image formation by the thus-constituted color laser beam printer, first, depending on pieces of image information of the respective colors, the photosensitive drums 50 of the respective image forming engines are exposed to light by the optical scanning apparatus 40. As a result, a latent image depending on the image information is formed on the associated one of the photosensitive drums 50 of the respective image forming engines 10. In order to obtain a good image quality, the latent image formed by the optical scanning apparatus 40 is required to be reproduced at a predetermined position of the photosensitive drum 50 with accuracy. A lowering in image quality generated due to deviation of a laser light condensing position by swing of an optical member in the optical scanning apparatus 40 due to vibration from a driving source is required to be prevented. Therefore, with respect to driving frequencies of various driving sources in the image forming apparatus, natural frequencies of all of optical members are required to be not coincident with the driving frequencies. For that reason, in a state in which the optical members are supported by a casing 105, it is required that attitudes of the optical members are stabilized so that the natural frequencies of the optical members do not largely change.

[Optical Scanning Apparatus]

Part (a) of FIG. 2 and FIG. 4 are schematic perspective views showing the neighborhood of an end portion of a mirror 62 of the optical scanning apparatus 40 in this embodiment. Part (b) of FIG. 2 is a schematic view showing an arrangement of the optical members inside the optical scanning apparatus of FIG. 1. A structure in the casing 105 side will be described while making reference to also parts (a) to (c) of FIG. 13. The optical scanning apparatus 40 includes the casing 105, a plurality of light sources (not shown) held at inner and outer peripheral portions of the casing 105, a deflector 41, lenses 64a to 64f, mirrors 62a to 62h, and the like. In the following, the lenses 64a to 64f are also referred to as the lens(es) 64, and the mirrors 62a to 62h are also referred to as the mirror(s) 62. The deflector 41 includes a rotatable polygonal mirror 42. The laser light emitted from the light source is constituted so that the laser light is deflected and subjected to scanning by the deflector 41 and passes through the lens 64 and then is reflected by the mirror 62. The lens 64 is used for reproducing a predetermined spot diameter on the photosensitive drum 50. The mirror 62 is used for guiding the laser light to the photosensitive drum 50. The mirror 62 is disposed inside the casing 105 so that a reflecting surface 621 is contaminated and thus a reflectance does not lower. The casing 105 includes a bottom on which the rotatable polygonal mirror 42 is mounted and an outer wall portion 105a which is a side wall which stands from the bottom. The casing 105 includes supporting bearing surfaces 71 and 72 which are supporting portions for supporting the optical members, and ribs 75 for preventing movement of the optical members in the longitudinal direction so that the optical members do not contact the outer wall portion 105a (FIG. 13).

The casing 105 and the mirror 62 are different in linear expansion coefficient from each other in many cases. For this reason, the mirror 62 is contacted to the supporting bearing surface 71, for holding the mirror 62, which is a part of the casing 105, by an urge force (pressure) of a leaf spring 72, and the mirror 62 is supported and fixed by the supporting bearing surface 71. The leaf spring 72 is a member for fixing the optical member to the casing 105.

The mirror 62 has the reflecting surface 621 including a light beam reflecting region R for reflecting the light beam and a surface 622 opposite from the reflecting surface 621 and contacting the supporting bearing surface 70 described later (FIG. 5). Further, the mirror 62 has a surface 623 perpendicular to the reflecting surface 621 and the surface 622 and contacting the supporting bearing surface 71 described later and a surface 624 opposite from the surface 623 (FIG. 5).

[Optical Path of Light Beam]

Next, using part (b) of FIG. 2, optical paths of light beams LBk, LC, LM and LY will be described. The light beam LY which is emitted from the light source (not shown) and which corresponds to the photosensitive drum 50Y is deflected by the rotatable polygonal mirror 42 and enters an optical lens 60a. The light beam LY passed through the optical lens 60a enters an optical lens 60b and passes through the optical lens 60b, and thereafter is reflected by the reflecting mirror 62a. The light beam LY reflected by the reflecting mirror 62a passes through a transparent window (not shown), so that the photosensitive drum 50Y is scanned with the light beam LY.

The light beam LM which is emitted from the light source (not shown) and which corresponds to the photosensitive drum 50M is deflected by the rotatable polygonal mirror 42 and enters an optical lens 60a. The light beam LM passed through the optical lens 60a enters an optical lens 60b and passes through the optical lens 60b, and thereafter is reflected by the reflecting mirrors 62b, 62c and 62d. The light beam LM reflected by the reflecting mirror 62d passes through a transparent window (not shown), so that the photosensitive drum 50M is scanned with the light beam LM.

The light beam LC which is emitted from the light source (not shown) and which corresponds to the photosensitive drum 50C is deflected by the rotatable polygonal mirror 42 and enters an optical lens 60c. The light beam LC passed through the optical lens 60c enters an optical lens 60d and passes through the optical lens 60d, and thereafter is reflected by the reflecting mirrors 62e, 62f and 62g. The light beam LC reflected by the reflecting mirror 62g passes through a transparent window (not shown), so that the photosensitive drum 50C is scanned with the light beam LC.

The light beam LBk which is emitted from the light source (not shown) and which corresponds to the photosensitive drum 50Bk is deflected by the rotatable polygonal mirror 42 and enters an optical lens 60c. The light beam LBk passed through the optical lens 60c enters an optical lens 60d and passes through the optical lens 60b, and thereafter is reflected by the reflecting mirror 62h. The light beam LBk reflected by the reflecting mirror 62h passes through a transparent window (not shown), so that the photosensitive drum 50Bk is scanned with the light beam LBk. In the following description, the optical lenses 60a to 60d are collectively referred to as the optical lens 60, and the reflecting mirrors 62a to 62h are collectively referred to as the reflecting mirror 62.

[Structure of Rib of Casing]

The ribs 75 provided on the casing 105 will be described. Parts (a) to (c) of FIG. 3 are schematic views for illustrating a condition in design when the ribs 75 are provided on the casing 105. The casing 105 is provided with a rib 75a in one end side of the reflecting mirror 62 and is provided with a rib 75b in the other end side of the reflecting mirror 62. The rib 75a is a facing portion facing a side end portion of the reflecting mirror 62 in one end side of the reflecting mirror 62, and the rib 75b is a facing portion facing a side end portion of the reflecting mirror 62 in the other end side of the reflecting mirror 62. In FIG. 3, the ribs 75 (75a, 75b) are provided in both sides (75a in one end side, 75b in the other end side), but may also have a constitution in which the ribs 75 are provided in one of one end side and the other end side.

The ribs 75a and 75b are provided for preventing the reflecting mirror 62 from being demounted (detached) from the supporting bearing surfaces 70 (70a, 70b) and the supporting bearing surfaces 71 (71a, 71b) when the reflecting mirror 62 moves in the longitudinal direction. Incidentally, the ribs 75a and 75b may also be reinforcing ribs provided for another purpose, for example, for reinforcing the casing 105 (for enhancing rigidity of the casing 105) or may also be side walls of the casing 105.

Here, as shown in part (a) of FIG. 3, a length of the reflecting mirror 62 with respect to the longitudinal direction is L. A length of each of the supporting bearing surfaces 70a and 71a which are first mirror supporting portions is W1, and a length of each of the supporting bearing surfaces 70b and 71b which are second mirror supporting portions is W2. The lengths W1 and W2 are also a contact width of each of the supporting bearing surfaces 70a and 71a with the reflecting mirror 62 and a contact width of each of the supporting bearing surfaces 70b and 71b with the reflecting mirror 62. The supporting bearing surfaces 70a and 71b are also a contact portion thereof with the reflecting mirror 62 with the contact width W1, and the supporting bearing surfaces 70b and 71b are also a contact portion thereof with the reflecting mirror 62 with the contact width W2. With respect to the longitudinal direction of the reflecting mirror 62, the supporting bearing surfaces 70a and 71a, the reflecting mirror 62 and the supporting bearing surfaces 70b and 71b constitute bearing surfaces for supporting outermost ends of the reflecting mirror 62 in both sides (one end side, the other end side).

A distance between the rib 75a and a closest position, to the rib 75a, of the contact portion of the supporting bearing surfaces 70a and 71a with the reflecting mirror 62 is D2. A distance between the rib 75b and a closest position, to the rib 75b, of the contact portion of the supporting bearing surfaces 70b and 71b with the reflecting mirror 62 is D3. A longest distance among distances between the contact portion of the supporting bearing surfaces 70a and 71a with the reflecting mirror 62 and the contact portion of the supporting bearing surfaces 70b and 71b with the reflecting mirror 62 is D1.

The ribs 75a and 75b are designed so that a relative positional relationship of the supporting bearing surfaces 70a and 71a with the supporting bearing surfaces 70b and 71b satisfy conditions shown below. Further, the length L of the reflecting mirror 62 is designed so as to satisfy conditions shown below.

<Case of Casing on Which Either One of Ribs 75a and 75b Exists>

Part (b) of FIG. 3 is a schematic view showing a state the reflecting mirror 62 is shifted to a left side in the figured and is contacted to the rib 75a. As shown in part (b) of FIG. 3, when the side end portion of the reflecting mirror 62 in one end side contacts the rib 75a, there is a need that a design is performed so that the reflecting mirror 62 is not demounted (detached) from the supporting bearing surfaces 70b and 71b in the other end side. Further, part (c) of FIG. 3 is a schematic view showing a state the reflecting mirror 62 is shifted to a right side in the figured and is contacted to the rib 75b. As shown in part (c) of FIG. 3, when the side end portion of the reflecting mirror 62 in the other end side contacts the rib 75b, there is a need that a design is performed so that the reflecting mirror 62 is not demounted (detached) from the supporting bearing surfaces 70a and 71a in one end side. For this reason, in the case of the casing 105 on which either one of the ribs 75a and 75b exists, the distance D2 between the rib 75a and the supporting bearing surfaces 70a and 71b satisfies the following formula (1).

$$D2<L+W2-D1 \quad (1)$$

(because D2+D1−W2<L)

Alternatively, the distance D3 between the rib 75b and the supporting bearing surfaces 70b and 71b satisfies the following formula (2).

$$D3<L+W1-D1 \quad (2)$$

(because D3+D1−W1<L)

<Case of Casing on Which Both of Ribs 75a and 75b Exist>

In the case of the casing 105 on which both of the ribs 75a and 75b exist, all of the following formulas (3) to (5) are satisfied.

$$D2<L+W2-D1 \quad (3)$$

$$D3<L+W1-D2 \quad (4)$$

$$D1+D2+D3<L \quad (5)$$

Here, the formula (5) is a condition for permitting the reflecting mirror 62 to enter between the ribs 75a and 75b.

Accordingly, in the case of the casing 105 on which both of the ribs 75a and 75b exist, all of the following conditions are satisfied.

The distance D2 between the rib 75a and the supporting bearing surfaces 70a and 71b satisfies the following formula (6).

$$D2<L+W2-D1 \quad (6)$$

(because D2+D1−W2<L)

The distance D3 between the rib 75b and the supporting bearing surfaces 70b and 71b satisfies the following formula (7).

$$D3<L+W1-D1 \quad (7)$$

(because D3+D1−W1<L)

The length L of the reflecting mirror 62 satisfies both of the following formulas (8) and (9).

$$D1+D2-W2<L<D1+D2+D3 \quad (8)$$

$$D1+D3-W1<L<D1+D2+D3 \quad (9)$$

The ribs 75, the supporting bearing surfaces 70 and 71 and the reflecting mirror 62 are designed so as to satisfy the above-described relationships.

[Leaf Spring]

With reference to FIGS. 2 to 7 and 13, a structure of the leaf spring 72 and a structure of the casing 105 in the neighborhood of a position where the mirror 62 is mounted by the leaf spring 72 will be described. The leaf spring 72 is formed by bonding a single thin plate. The leaf spring 72 includes a base portion 72h having a reference surface 72r, first and second plate-like portions 72i and 72j each bent from the base portion 72h, and a pair of a preventing-shaped portions 84. The base portion 72h is a portion contacting a spring supporting member 33 which is a leaf spring supporting portion. The leaf spring 72 urges (presses) the reflecting mirror 62 in an elastically deformed state in one end side of the reflecting mirror 62 so that the reflecting mirror 62 is urged against the spring supporting member 33. The first plate-like portion 72i is folded (bent) from one end of the base portion 72h in a substantially V-shape and extends toward the other end side of the base portion 72h in a side opposite from the reference surface 72r. The second plate-like portion 72j is folded (bent) at substantially right angle from the other end of the base portion 72h and extends in a direction crossing the first plate-like portion 72i in a side opposite from a reference surface 72a. The pair of preventing-shaped portions 84 which is a pair of preventing members is folded (bent) at substantially right angles from both side ends of the base portion 72h toward the reference surface 72r side (toward a side opposite from the first and second plate-like portions 72i and 72j).

The reference surface 72r is one surface of the thin plate-like base portion 72h and contacts a prism portion 33a of the spring supporting member 33, and is a basis of a position of the leaf spring 72. The first urging portion 72a is a portion bent in a projected shape so as to project toward a side opposite from the base portion 72h at the first plate-like portion 72i. The first urging portion 72a contacts the reflecting surface 62l of the mirror 62 by insertion of the first plate-like portion 72i and the base portion 72h between the mirror 62 and the spring supporting portion 72h in a state in which the portions 72i and 72h are flexed (compressed) against an elastic force. As a result, the first urging portion 72a is elastically urges the mirror 62 against the supporting bearing surface 70 of the mirror supporting member 31.

The second urging portion 72b is a portion obtained by bending a free end portion of the second plate-like portion 72j in a direction of the first plate-like portion 72i with an obtuse angle. The second urging portion 72b contacts a surface 624 of the mirror 62. The second urging portion 72b elastically urges the mirror 62 against the supporting bearing surface 71 of the mirror supporting member 31 by locking the leaf spring 72 by the spring supporting member 33 in a flexed (bent) state of the second plate-like portion 72j toward the base portion 72h against the elastic force. The hole 72e is an opening provided in the reference surface 72r and penetrates through both sides (surfaces) of the base portion 72h, and a portion defining the hole 75e forms a locking portion (barked portion) 96 engaging with an engaging portion M (FIG. 5) of the spring supporting portion 33. The base portion 72h includes a portion folded back toward the first plate-like portion 72i, i.e., projected flat surface portions 72m projecting toward both sides at a lower portion of the pair of preventing shaped portions 84, and a free end portion of each of the projected flat surface portions 72m is bent toward a side opposite from the first plate-like portion 72i and constitutes a stopper 72n. The stopper 72n is constituted so as to abut against the spring supporting member 33 when the leaf spring 72 is mounted in the casing 105.

As shown in FIG. 13, the casing 105 includes the supporting bearing surface 70, at a position corresponding to each of longitudinal end portions of the mirror 62, for holding the surface 622 (FIG. 5) which is a longitudinal side surface of the mirror 62 in cross section. The supporting bearing surface 70 is constituted as follows so that the leaf spring 72 does not twist the mirror 62 by a force of pressing the mirror 62 in a direction perpendicular to the reflecting surface 621 of the mirror 62 when the supporting bearing surface 70 holds the mirror 62. The supporting bearing surface 70 includes one supporting bearing surface 70a which is a single bearing surface provided at one end portion with respect to the longitudinal direction and includes two supporting bearing surfaces 70b which are two bearing surfaces provided at the other end portion with respect to the longitudinal direction. In this embodiment (Embodiment 1) a constitution in which the single surface 622 (the longitudinal side surface in cross section) of the mirror 62 is supported by the supporting bearing surfaces 70 (70a, 70b) at three positions (points) in total is employed.

The casing 105 includes the supporting bearing surfaces 71a and 71b, at positions corresponding to the longitudinal end portions of the mirror 62, for holding the surface 623 (FIG. 5) which is a widthwise side surface of the mirror 62 in cross section. Further, as shown in FIG. 9, the casing 105 includes a bearing surface 71c, between the bearing surfaces 71a and 71b, for supporting a surface 623. The bearing surface 71c is provided at a position closer to the bearing surface 71b than to the bearing surface 71a. Incidentally, also in the bearing surface 71a side, a bearing surface (not shown) is provided similarly as in the case of the bearing surface 71c. The bearing surface 71c is a bearing surface provided so that the natural frequency of the mirror 62 is a predetermined frequency (estimated frequency in design) in order to prevent the mirror 62 from resonating with vibration of the driving source.

By employing such a constitution, with respect to the longitudinal direction N of the mirror 62, a distance between the supporting bearing surfaces 71 for supporting the surface 623 which is the widthwise side surface in cross section can be changed relative to a distance between the supporting bearing surfaces 70 for supporting the surface 622 which is the longitudinal side surface in cross section. As a result, it becomes possible to control the natural frequency of the mirror 62 constrained by the leaf spring 72 by increasing and decreasing the natural frequency of the mirror 62.

The leaf spring 72 fixes the mirror 62 to the casing 105 so that the mirror 62 does not move due to the influence of vibration, impact or the like during transportation, an installing operation or the like of the optical scanning apparatus 40. The leaf spring 72 includes the first urging portion 72a provided at the free end portion of the first plate-like portion 72i. The first urging portion 72a is an urging portion for urging the reflecting surface 621, which is a first surface of the optical member, of the mirror 62 in a direction perpendicular to the reflecting surface 621. The leaf spring 72 includes the second urging portion 72b provided at the free end portion of the second plate-like portion 72j. The second urging portion 72b is an urging portion for urging the surface 624, which is a second surface perpendicular to the first surface of the optical member, perpendicular to the reflecting surface 621 of the mirror 62. The first urging portion 72a urges the reflecting surface 621 of the mirror 62 and thus urges the surface 622, opposite from the reflecting surface 621, against the supporting bearing surface 70. The second urging portion 72b urges the surface 624 perpendicular to the reflecting surface 621 and thus urges the surface 623, opposite from the surface 624, against the supporting bearing surface 71.

The first urging portion 72a and the second urging portion 72b are constituted so as to at least partly overlap with each other with respect to the longitudinal direction of the mirror 62 as seen in an opening direction K of the casing 105 or in a rotational axis direction J of the rotatable polygonal mirror 42 (part (b) of FIG. 2). In this embodiment, the opening direction K of the casing 105 and the rotational axis direction J of the rotatable polygonal mirror 42 are the same direction. As a result, with respect to the longitudinal direction of the mirror 62, a distance L between a light beam reflection region R of the reflecting surface of the mirror 62 and the outer wall portion 105a of the casing 105 can be designed so as to be small, and therefore the optical scanning apparatus 40 can be downsized.

The first urging portion 72a of the leaf spring 72 includes a first bent portion 77 at a free end portion thereof. The first bent portion 77 is constituted so as to extend from a contact point Q thereof with the reflecting surface 621 of the mirror 62 or the surface 622 opposite from the reflecting surface 621 and so as to become more distant from the mirror 62 with a position toward the opening direction of the casing 105.

[Structure of Second Urging Portion of Leaf Spring]

FIG. 4 is a schematic view showing a structure of the second urging portion 72b of the leaf spring 72 in Embodiment 1. The second urging portion 72b is provided with an opening 78 at a free end portion thereof. The opening 78 is provided for guiding an adhesive S, which is an adhesive member, between the leaf spring 72 and the mirror 62. The opening 78 is indicated by a broken line and is provided for the purpose of bonding the second urging portion 72b to the surface 624, of the mirror 62, perpendicular to the reflecting surface 621 by being applied dropwisely from above the opening 78 (in an arrow direction). FIG. 5 is a sectional view of the neighborhood of the leaf spring 72 as seen in the longitudinal direction (−Y direction in FIG. 4) of the mirror 62 shown in FIG. 4. Incidentally, unrelated shape lines for illustrating FIG. 5 are removed. The adhesive S is applied dropwisely from above the opening 78. FIG. 5 shows a state after a lapse of a certain time from the dropwise application of the adhesive S.

The adhesive S changes in shape due to viscosity in a period from the dropwise application to solidification thereof. In a process in which the adhesive S changes in shape, the adhesive S entering the opening 78 contacts both of the second urging portion 72*b* and the mirror 62. The adhesive S which does not enter the opening 78 runs while moving in a direction of gravitation. The second urging portion 72*b* is provided with a receiving and throttling portion 79 which is a recess-shaped portion. The receiving and throttling portion 79 is formed at the second urging portion 72 as the recess-shaped portion recessed toward the first urging portion 72*a* side (toward the mirror 62 side). At a bottom of the recess-shaped portion, the opening 78 is provided. The adhesive S moved in the direction of gravitation is held by the receiving and throttling portion 79. As a result, even when a time elapsed from the dropwise application of the adhesive S, the adhesive S is prevented from running through the receiving and throttling portion 79. A moving speed and a moving distance of the adhesive S depend on a viscosity of the adhesive S before curing. Even after a lapse of a certain time, the adhesive S does not readily move in the direction of gravitation when the viscosity is high, and a movement amount of the adhesive S is large when the viscosity is low. In this embodiment, an ultraviolet (UV) curable adhesive is assumed. As regards the UV curable adhesive, as the viscosity before curing with ultraviolet rays, various values thereof are prepared. For this reason, an adhesive having an adhesive and a viscosity such that the adhesive can be held by the shape of the receiving and throttling portion 79 may only be required to be selected.

[Structure of Receiving and Throttling Portion]

FIG. 6 is an enlarged view of a shape at a periphery of the adhesive S shown in FIG. 5. As described above, the second urging portion 72*b* includes the opening 78 and the receiving and throttling portion 79 provided around the opening 78. As a further feature, an edge 81 which is an edge portion of the receiving and throttling portion 79 defining the opening 78 has a shape such that the edge 81 cannot directly contact the mirror 62. In the case where the edge 81 has a shape such that the edge 81 is directly contactable to the mirror 71, when the leaf spring 72 is mounted to the casing 105, there is a possibility that a change in attitude of the mirror 62 is caused by a force exerted on the mirror 62. Then, there is a liability that the mirror 62 is shifted from a properly positioned state. For this reason, in this embodiment, the shape of the receiving and throttling portion 79 is formed so that the receiving and throttling portion 79 is warped toward the opening 78, and constitutes a return shape portion 82.

Thus, the receiving and throttling portion 79 of the leaf spring 72 includes the return shape portion 82. In the case where the receiving and throttling portion 79 of the leaf spring 72 is seen in a cross section perpendicular to the longitudinal direction of the mirror 62, the receiving and throttling portion 79 has a projected shape such that the receiving and throttling portion 79 projects toward the mirror 62 side at two points 80 and 90. Of the two points 80 and 90 of the receiving and throttling portion 79 of the second urging portion 72*b*, the point 80 contacts the mirror 62 but the point 90 does not contact the mirror 62. Thus, the receiving and throttling portion 79 of the leaf spring 72 always contacts the mirror 62 in a downstream side of the direction of gravitation. That is, the point 90 disposed in an upstream side opposite from the downstream side in the direction of gravitation does not contact the mirror 62. As described above, the portion, in the neighborhood of the opening 78, of the second urging portion 72*b* of the leaf spring 72 is formed as the return shape portion 82, so that a region in which the leaf spring 72 contacts the mirror 62 in the neighborhood of the opening 78 contacts the mirror 62 in a line-contact manner or a point-contact manner along a circumference of the opening 78, not in a plane (surface)-contact manner.

Here, the contact of the second urging portion 72*b* with the mirror 62 at an entirety of the circumference of the opening 78 is not practical when a component tolerance is taken into consideration. Therefore, the mirror 62 and the second urging portion 72 are ought to contact each other in the point-contact manner or in a region close to a point-contact region. At that time, a priority is such that the adhesive S entering the opening 78 does not flow in the direction of gravitation. In the case where the adhesive S enters the opening 78, when a constitution in which the second urging portion 72*b* of the leaf spring 72 always point-contacts the mirror 62 at the point 80 (or partly line-contacts the mirror 62 along the circumference of the opening 78) is employed, the adhesive S can be held at the contact portion. This is because at a periphery of the point-contact region, a gap between the second urging portion 72*b* and the mirror 62 is also small, and therefore by the viscosity and surface tension of the adhesive S, the adhesive S does not further flow down toward the downstream side of the direction of gravitation.

FIG. 7 is a perspective view of a region including the point 80 as seen from a back side without illustrating the casing 105. As shown in FIG. 7, there is a possibility that the point 80 has a shape slightly extending along the circumference of the opening 78. However, the adhesive S contacts the mirror 62 in a self-weight flowing side, i.e., the downstream side of the direction of gravitation. In a state of FIG. 6, when the adhesive S is irradiated with UV rays from above, the adhesive S which is the UV curable adhesive S is cured. As a result, the mirror 62 and the second urging portion 72*b* are firmly fixed to each other with the adhesive S.

In this embodiment, when the mirror 62 and the second urging portion 72*b* of the leaf spring 72 are fixed with the adhesive S, these members are fixed with the gap therebetween so that longitudinal end portions of the mirror 62 and the casing 105 (rib 75) do not contact each other. In general, strength of the adhesive S is sufficient with respect to the weight of the mirror 62, and therefore a state in which the end portions of the mirror 62 always do not contact the casing 105 can be maintained. Therefore, it is possible to avoid a change in condition during installation from a condition during factory shipment due to, e.g., contact with the rib 75 or the like caused by slight shift of the position of the mirror 62 due to an impact during transportation of the optical scanning apparatus 40, the installation or the like. As a result, a problem such that the natural frequency of the mirror 62 shifts to an unintended band can be solved.

[Natural Frequency of Mirror]

FIG. 8 is a graph showing data by which whether or not the natural frequency of the mirror 62 is changed by bonding the mirror 62 and the leaf spring 72 to each other with the adhesive S was checked. The abscissa represents a frequency (Hz), and the ordinate represents an acceleration (m/s$^2$). In FIG. 8, "SIDE FREE" indicated by a solid line is a graph measured in a state such that the bonding with the adhesive S is not carried out and the longitudinal end portions of the mirror 62 are not contacted to the casing 105

(rib 75). "SIDE CONTACT" indicated by a broken line is a graph measured in a state such that the bonding with the adhesive S is not carried out and the longitudinal end portions of the mirror 62 are contacted to the casing 105 (rib 75). It is understood that the natural frequency of the mirror 62 changes depending on whether or not the mirror 62 contacts the casing 105 (rib 75).

The reflecting mirror 62 is fixed by the first leaf spring 72 in one end side and is fixed by the second leaf spring 72 in the other end side. At least one of the first leaf spring 72 and the second leaf spring 72 is bonded to the reflecting mirror 62 with the adhesive S. For example, the case where only the first leaf spring 72 for fixing the reflecting mirror 62 in one end side is bonded and the case where only the second leaf spring 72 for fixing the reflecting mirror 62 in the other end side is bonded exist. Further, there is a case where both of the first leaf spring 72 for fixing the reflecting mirror 62 in one end side and the second leaf spring 72 for fixing the reflecting mirror 72 in the other end side are bonded.

In FIG. 8, "ONLY ONE POINT BONDING (IN ONE SIDE)" indicated by a chain line is a graph measured in a state in which the bond with the adhesive S is carried out using the leaf spring 72 in this embodiment and the longitudinal end portions of the mirror 62 is not contacted to the casing 105 (rib 75). Of the two end portions of the mirror 62, only in the supporting bearing surface 70a side where the single supporting bearing surface 70 described with reference to FIG. 13 is provided, the mirror 62 and the leaf spring 72 are bonded to each other with the adhesive S. "ONLY TWO POINT BONDING (IN THE OTHER SIDE)" indicated by a dotted line is a graph measured in a state in which the bond with the adhesive S is carried out using the leaf spring 72 in this embodiment and the longitudinal end portions of the mirror 62 is not contacted to the casing 105 (rib 75). Of the two end portions of the mirror 62, only in the supporting bearing surface 70b side where the two supporting bearing surfaces 70 described with reference to FIG. 13 is provided, the mirror 62 and the leaf spring 72 are bonded to each other with the adhesive S. "BOTH SIDE BONDING" indicated by a chain double-dashed line is a graph measured in a state in which the bond with the adhesive S is carried out using the leaf spring 72 in this embodiment and the longitudinal end portions of the mirror 62 is not contacted to the casing 105 (rib 75). In both of the supporting bearing surface 70a side where the supporting bearing surface 70b side where the two supporting bearing surfaces 70 described with reference to FIG. 13 are provided, i.e., at both end portions of the mirror 62, the mirror 62 and the leaf spring 72 are bonded to each other with the adhesive S.

As shown in the graph of FIG. 8, in either of the cases where the leaf spring 72 is bonded to the mirror 62 in one end side and in both end sides, it is understood that the natural frequency is unchanged from the case of "SIDE FREE". The position of the mirror 62 is prevented from deviating by the bonding to the mirror 62 with use of the leaf spring 72 in this embodiment, and therefore, a change in natural frequency (resonance point) of the mirror 62 due to contact of the mirror 62 to the casing at a side end surface the mirror 62 can be suppressed.

As described above, a constitution in which the supporting bearing surfaces 70, provided at the longitudinal end portions, for holding the surface 622 which is a longitudinal side surface of the mirror 62 in cross section includes the single supporting bearing surface 70a in one end side and the two supporting bearing surfaces 70b in the other end side and thus the single surface 622 is supported by the three bearing surfaces in total. The reason why the surface 622 is supported by the three bearing surfaces is that when the mirror 62 is held by the bearing surfaces 70, the mirror 62 is prevented from twisting caused by a force of the leaf spring 72 pressing the mirror 62 in the direction perpendicular to the reflecting surface 621 of the mirror 62. As shown in FIG. 8, even when the leaf spring 72 is fixed in the one-point side and even when the leaf spring 72 is fixed in the two-point side, the natural frequency is unchanged, so that an effect of stabilizing the attitude of the mirror 62 is unchanged between the two sides.

In the case where the mirror 62 is supported by the bearing surfaces at these positions, in general, the bearing surfaces from which the mirror 62 is liable to demount (detach) due to an impact or the like exerted on the optical scanning apparatus 40 during transportation are the supporting bearing surfaces 70 in the two-point side close to the end portion of the mirror 62. In a preferred embodiment, a constitution in which the leaf spring 72 for fixing the mirror 62 to the supporting bearing surfaces 70b in the two-point supporting side is bonded to the mirror 62 and holds (supports) the mirror 62 is excellent in shock (impact) resistance.

In the case where the constitution of this embodiment is employed, there is a need that the leaf spring 72 and the mirror 62 are fixed to each other with the adhesive S and thereafter consideration is given to prevention of movement of the leaf spring 72 relative to the casing 105. If the leaf spring 72 is movable in the longitudinal direction N of the mirror 62 shown in part (a) of FIG. 2, there is a liability that the mirror 62 is consequently contacted to the casing 105 by the movement of the leaf spring 72.

Therefore, as shown in part (a) of FIG. 2, in order to prevent the movement of the leaf spring 72 in the N direction, a constitution in which the leaf spring 72 is provided with a pair of preventing shape portions 84 (back surface thereof is not shown) may also be employed. A constitution in which the spring supporting member 33 of the casing 105 is provided with the prism portion 33a and the preventing shape portions 84 of the leaf spring 72 elastically sandwiches the prism portion 33 may only be required to be employed.

As described above, according to Embodiment 1, the natural frequency of the elongated reflecting mirror provided in the optical scanning apparatus can be stabilized with a simple constitution. In Embodiment 1, by using the second urging portion 72b of the leaf spring 72, the mirror 62 is bonded and the longitudinal position of the mirror 62 is regulated. As a result, stabilization of the natural frequency of the mirror 62 is realized. When the regulation of the longitudinal position of the mirror 62 is carried out by bonding the mirror 62 to the elastic member for fixing the mirror 62, the present invention is not limited to the above-described embodiment. Further, according to Embodiment 1, the adhesive S is applied using the gap between the optical member (member 62) and the outer wall portion 105a and therefore an increase in size of the casing 105 can be avoided. The second urging portion 72b is provided with the opening 78, so that when the adhesive S is applied from above the opening 78, the adhesive S spreads all over both of the optical member and the opening 78 and thus the bonding can be easily carried out. The receiving and throttling portion 79 having the projected shape is provided in a lower side where the adhesive member can be held, so that when the adhesive S is applied, flowing-out of the adhesive S in an uncured state toward the light beam reflecting region R side of the mirror 62 can be avoided. For this reason, operativity during the bonding step can be improved. The edge 81 of the opening 78 has a shape such that the edge 81 does not directly contact the surface 624 of the mirror 62. As a result, it is possible to avoid the change in attitude of the mirror 62 caused by the edge 81 of the opening 78. The region where the leaf spring 72 contacts the surface 624 of the mirror 62 is always the downstream side of the direction of gravitation. Therefore, the flowing-out, toward the light beam reflecting region R side of the mirror 62, of the adhesive S which entered the opening 78 and which is in the uncured state can be avoided. For this reason, the operativity during the bonding step can be improved. The bonding between the leaf spring 72 and the mirror 62 may be carried out in the one-point supporting bearing surface side or the two-point supporting bearing surface side. Further, the mirror 62 may also be bonded at both end portions thereof. In a preferred example, the mirror 62 is bonded in the bearing surface side where the mirror 62 is supported by the two points, so that when the impact (shock) is applied, demounting of the mirror surface from the two-point supporting surfaces can be avoided and thus reliability is improved.

[Embodiment 2]

In Embodiment 1, the constitution in which the second urging portion 72b of the leaf spring 72 is bonded to the mirror 62 is employed. In this embodiment, a constitution in which the first urging portion 72a of the leaf spring 72 is bonded to the mirror 62 will be described. Incidentally, constitutions of the printer and the optical scanning apparatus 40 are similar to those in Embodiment 1 and are represented by the same reference numerals or symbols, and will be omitted from description.

[First Urging Portion]

A structure of the leaf spring 72 in this embodiment will be described with reference to FIGS. 9 and 13. As regards the leaf spring 72, constituent elements similar to those in Embodiment 1 are represented by the same reference numerals or symbols and will be omitted from description. The leaf spring 72 in this embodiment has a constitution for bonding the adhesive S to the first urging portion 72a. The first urging portion 72a includes a first bent portion 77 bent toward the second plate-like portion 72j at a free end portion thereof and a pair of second bent portions 89 each extending from the first bent portion 77 toward the second urging portion 72b side. The pair of second bent portions 89 is bent from both ends of the first bent portion 77 toward the second urging portion 72b side at substantially right angles.

The leaf spring 72 is constituted so that at least a part of the first bent portion 77 provided at the first urging portion n72a overlaps with at least a part of the second urging portion 72b as seen in an arrow K direction or an arrow J direction in part (b) of FIG. 2. At a part of the second plate-like portion 72j of the leaf spring 72, a first opening 88 for permitting application of the adhesive S onto the first bent portion 77 is provided. As shown in FIG. 10, the adhesive S is applied onto the first urging portion 72a through the first opening 88 provided in the second plate-like portion 72j of the leaf spring 72. Movement of the adhesive S in the longitudinal direction of the mirror 62 is prevented by the second bent portions 89.

By employing such a constitution, the adhesive S can be smoothly applied onto a contact point between the mirror 62 and the leaf spring 72 provided in a space-saving manner. That is, the adhesive S accesses the mirror 62 from the light beam reflecting region R side, so that positioning of the mirror 62 and stabilization of the natural frequency of the mirror 62 can be realized without contaminating the reflecting surface 621 of the mirror 62. Further, it becomes possible to realize the positioning of the mirror 62 and the stabilization of the natural frequency of the mirror 62 while avoiding such a problem that a size of the casing 105 is required to be increased for applying the adhesive S by using the gap between the leaf spring 72 and a wall surface of the outer wall portion 105a of the casing 105. The leaf spring 72 includes the first bent portion 77, so that the adhesive S can be applied between the mirror 62 and the first bent portion 77 and thus the operation is facilitated.

In this embodiment, when the mirror 62 and the first urging portion 72a of the leaf spring 72 are fixed by bonding, these members are fixed with the gap therebetween so that longitudinal end portions of the mirror 62 and the casing 105 do not contact each other. In general, strength of the adhesive S is sufficient with respect to the weight of the mirror 62, and therefore a state in which the end portions of the mirror 62 always do not contact the casing 105 can be formed. Therefore, it is possible to avoid a problem such that the attitude of the mirror 62 is changed from a positioned state during shipment due to an impact during transportation of the optical scanning apparatus 40, the installation or the like, and thus the natural frequency of the mirror 62 shifts to an unintended band.

Parts (a) and (b) of FIG. 11 are schematic perspective views for illustrating a state in which the mirror 62 is fixed by the leaf spring 72 at one end portion of the mirror 62 in this embodiment. Parts (c) and (d) of FIG. 11 are perspective views showing a structure of the leaf spring 72 in this embodiment. The leaf spring 72 includes the first bent portion 77 in the neighborhood of a contact point Q (FIG. 9) with the mirror 62 and the pair of second bent portions 89 at both end portions of the first bent portion 77 with respect to the longitudinal direction of the mirror 62. By employing such a constitution, it is possible to prevent the adhesive S from flowing out toward the light beam reflecting region R when the adhesive S is applied onto the first bent portion 77, so that operativity can be improved.

At a position adjacent to the contact point Q of the first bent portion 77, a second opening 74 for permitting flow of the adhesive S toward a rotation center during deformation of the first urging portion 72a of the leaf spring 72 in the case where an amount of the applied adhesive S is excessively large. By providing the second opening 74, even in the case where the application amount of the adhesive S is large, the adhesive S passes through the second opening 74 and moves on the first plate-like portion 72i of the leaf spring 72. As a result, even in the case where the application amount of the adhesive S is large, it becomes possible to avoid the problem such that the light beam reflecting region R of the mirror 62 is contaminated with the adhesive S.

[Natural Frequency of Mirror]

FIG. 12 is a graph showing data by which whether or not the natural frequency of the mirror 62 is changed by bonding the mirror 62 and the first urging portion 72a of the leaf spring 72 to each other with the adhesive S was checked. The graphs in FIG. 12 are similar to those in FIG. 8, and therefore, will be omitted from description. As shown in the graph of FIG. 12, in either of the cases where the leaf spring 72 is bonded to the mirror 62 in one end side and in both end sides, it is understood that the natural frequency is unchanged from the case of "SIDE FREE". The position of the mirror 62 can be prevented from deviating, by the fixing to the mirror 62 with use of the leaf spring 72 and thus by bonding the leaf spring 72 and the mirror 62 to each other, without shifting the natural frequency (resonance point) of the mirror 62.

As described above, even in the case where the leaf spring 72 in Embodiment 2 is used, an effect similar to that in Embodiment 1 is achieved. According to Embodiment 2, the natural frequency of the elongated reflecting mirror installed in the optical scanning apparatus can be stabilized with a simple constitution. As described above, according to the present invention, the natural frequency of the elongated reflecting mirror provided in the optical scanning apparatus can be stabilized with the simple constitution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-193934 filed on Sep. 30, 2016, which is hereby incorporated by reference herein in its entirety.

What is claimed is:

1. An optical scanning apparatus comprising:
    a light source configured to emit a light beam;
    a deflecting unit configured to deflect the light beam so that a photosensitive member is scanned with the light beam emitted from said light source;
    a reflection mirror configured to guide the light beam, onto the photosensitive member, deflected by said deflecting unit; and
    a casing configured to accommodate said deflecting unit and said reflection mirror; and
    first and second leaf springs,
    wherein said casing includes a first mirror supporting portion configured to support said reflection mirror in one end side, a second mirror supporting portion configured to support said reflection mirror in the other end side with respect to a longitudinal direction of said reflection mirror, and a facing portion configured to face a side end portion of said reflection mirror in said one end side,
    wherein the following relationship is satisfied:

$$D2<L+W-D1,$$

where with respect to the longitudinal direction, L is a length of said reflection mirror, D1 is a longest distance of distances between a contact portion of said first mirror supporting portion to said reflection mirror and a contact portion of said second mirror supporting portion to said reflection mirror, W is a contact width of said second mirror supporting portion to said reflection mirror, and D2 is a distance between said facing portion and a position, closest to said facing portion, of the contact portion of said first mirror supporting portion to said reflection mirror,
    wherein said first leaf spring urges said reflection mirror in an elastically deformed state in said one end side so as to urge said reflection mirror against said first mirror supporting portion,
    wherein said second leaf spring urges said reflection mirror in an elastically deformed state in said the other side so as to urge said reflection mirror against said second mirror supporting portion, and
    wherein at least one of said first and second leaf springs is bonded to said reflection mirror with an adhesive.

2. An optical scanning apparatus according to claim 1, wherein said casing includes leaf spring supporting portions configured to support said first and second leaf springs,
    wherein each of said first and second leaf springs includes a base portion contacting said leaf spring supporting portion, a first plate-like portion bent from one end of said base portion, and a second plate-like portion bent from the other end of said base portion toward said first plate-like portion,
    wherein each of said first and second leaf springs further includes a first urging portion provided as a part of said first plate-like portion and configured to urge a first surface of said reflecting mirror facing in the same direction as a reflecting surface of said reflecting mirror, and a second urging portion provided as a part of said second plate-like portion and configured to urge a second surface, of said reflecting mirror, crossing the first surface of said reflecting mirror, and
    wherein said first urging portion is bonded to said reflecting mirror with the adhesive.

3. An optical scanning apparatus according to claim 1, wherein said casing includes leaf spring supporting portions configured to support said first and second leaf springs,
    wherein each of said first and second leaf springs includes a base portion contacting said leaf spring supporting portion, a first plate-like portion bent from one end of said base portion, and a second plate-like portion bent from the other end of said base portion toward said first plate-like portion,
    wherein each of said first and second leaf springs further includes a first urging portion provided as a part of said first plate-like portion and configured to urge a first surface of said reflecting mirror facing in the same direction as a reflecting surface of said reflecting mirror, and a second urging portion provided as a part of said second plate-like portion and configured to urge a second surface, of said reflecting mirror, crossing the first surface of said reflecting mirror, and
    wherein said second urging portion is bonded to said reflecting mirror with the adhesive.

4. An optical scanning apparatus according to claim 3, wherein as seen in a rotational axis direction of said deflecting unit, said second plate-like portion overlaps with said first plate-like portion with respect to the longitudinal direction.

5. An optical scanning apparatus according to claim 4, wherein said second plate-like portion is provided with an opening for guiding the adhesive to between itself and said reflecting mirror.

6. An optical scanning apparatus according to claim 5, wherein said second plate-like portion includes a recess-shaped portion recessed toward said reflecting mirror, and said opening is provided at a bottom of said recess-shaped portion.

7. An optical scanning apparatus according to claim 2, wherein said first mirror supporting portion has one bearing surface for supporting one end portion of said reflecting mirror, and said second mirror supporting portion has two bearing surfaces for supporting the other end portion of said reflecting mirror, and
    wherein said leaf spring is bonded to said reflecting mirror in a side where the bearing surfaces are provided.

8. An optical scanning apparatus according to claim 2, wherein said leaf spring includes, at end portions of said base portion with respect to the longitudinal direction, a pair of preventing members configured to prevent movement of said leaf spring in the longitudinal direction by elastically sandwiching said leaf spring supporting portion therebetween.

9. An optical scanning apparatus according to claim 1, wherein said facing portion is provided for preventing said reflecting mirror formed disconnecting from said mirror supporting portion.

10. An optical scanning apparatus according to claim 1, wherein said facing portion is a side wall of said casing.

11. An optical scanning apparatus according to claim 1, wherein said facing portion is a reinforcing rib configured to reinforce said casing.

12. An image forming apparatus comprising:
a photosensitive member;
an optical scanning apparatus, according to claim 1, configured to form a latent image on said photosensitive member;
a developing portion configured to develop, with toner, the latent image formed by said optical scanning apparatus thereby to form a toner image; and
a transfer portion configured to transfer the toner image, formed by said developing portion, onto a toner image receiving member.

13. An optical scanning apparatus comprising:
a light source configured to emit a light beam;
a deflecting unit configured to deflect the light beam so that a photosensitive member is scanned with the light beam emitted from said light source;
a reflection mirror configured to guide the light beam, onto the photosensitive member, deflected by said deflecting unit; and
a casing configured to accommodate said deflecting unit and said reflection mirror; and
first and second leaf springs,
wherein said casing includes a first mirror supporting portion configured to support said reflection mirror in one end side, a second mirror supporting portion configured to support said reflection mirror in the other end side with respect to a longitudinal direction of said reflection mirror, a first facing portion configured to face a side end portion of said reflection mirror in said one end side, and a second facing portion configured to face a side end portion of said reflecting mirror in said the other end side,
wherein the following relationships are satisfied:

$$D2 < L + W2 - D1,$$

$$D3 < L + W1 - D1, \text{ and}$$

$$D1 + D2 + D3 > L$$

where with respect to the longitudinal direction, L is a length of said reflection mirror, D1 is a longest distance of distances between a contact portion of said first mirror supporting portion to said reflection mirror and a contact portion of said second mirror supporting portion to said reflection mirror, W1 is a contact width of said first mirror supporting portion to said reflecting mirror, W2 is a contact width of said second mirror supporting portion to said reflection mirror, D2 is a distance between said first facing portion and a position, closest to said first facing portion, of the contact portion of said first mirror supporting portion to said reflection mirror, and D3 is a distance between said second facing portion and a position, closest to said second facing portion, of the contact portion of said second mirror supporting portion to said reflecting mirror,
wherein said first leaf spring urges said reflection mirror in an elastically deformed state in said one end side so as to urge said reflection mirror against said first mirror supporting portion,
wherein said second leaf spring urges said reflection mirror in an elastically deformed state in said the other side so as to urge said reflection mirror against said second mirror supporting portion, and
wherein at least one of said first and second leaf springs is bonded to said reflection mirror with an adhesive.

14. An optical scanning apparatus according to claim 13, wherein said casing includes leaf spring supporting portions configured to support said first and second leaf springs,
wherein each of said first and second leaf springs includes a base portion contacting said leaf spring supporting portion, a first plate-like portion bent from one end of said base portion, and a second plate-like portion bent from the other end of said base portion toward said first plate-like portion,
wherein each of said first and second leaf springs further includes a first urging portion provided as a part of said first plate-like portion and configured to urge a first surface of said reflecting mirror facing in the same direction as a reflecting surface of said reflecting mirror, and a second urging portion provided as a part of said second plate-like portion and configured to urge a second surface, of said reflecting mirror, crossing the first surface of said reflecting mirror, and
wherein said first urging portion is bonded to said reflecting mirror with the adhesive.

15. An optical scanning apparatus according to claim 13, wherein said casing includes leaf spring supporting portions configured to support said first and second leaf springs,
wherein each of said first and second leaf springs includes a base portion contacting said leaf spring supporting portion, a first plate-like portion bent from one end of said base portion, and a second plate-like portion bent from the other end of said base portion toward said first plate-like portion,
wherein each of said first and second leaf springs further includes a first urging portion provided as a part of said first plate-like portion and configured to urge a first surface of said reflecting mirror facing in the same direction as a reflecting surface of said reflecting mirror, and a second urging portion provided as a part of said second plate-like portion and configured to urge a second surface, of said reflecting mirror, crossing the first surface of said reflecting mirror, and
wherein said second urging portion is bonded to said reflecting mirror with the adhesive.

16. An optical scanning apparatus according to claim 14, wherein as seen in a rotational axis direction of said deflecting unit, said second plate-like portion overlaps with said first plate-like portion with respect to the longitudinal direction.

17. An optical scanning apparatus according to claim 16, wherein said second plate-like portion is provided with an opening for guiding the adhesive to between itself and said reflecting mirror.

18. An optical scanning apparatus according to claim 17, wherein said second plate-like portion includes a recess-shaped portion recessed toward said reflecting mirror, and said opening is provided at a bottom of said recess-shaped portion.

19. An optical scanning apparatus according to claim 14, wherein said first mirror supporting portion has one bearing surface for supporting one end portion of said reflecting mirror, and said second mirror supporting portion has two bearing surfaces for supporting the other end portion of said reflecting mirror, and
wherein said leaf spring is bonded to said reflecting mirror in a side where the bearing surfaces are provided.

20. An optical scanning apparatus according to claim 14, wherein said leaf spring includes, at end portions of said base portion with respect to the longitudinal direction, a pair of preventing members configured to prevent movement of said leaf spring in the longitudinal direction by elastically sandwiching said leaf spring supporting portion therebetween.

21. An optical scanning apparatus according to claim 13, wherein said facing portion is provided for preventing said reflecting mirror formed disconnecting from said mirror supporting portion.

22. An optical scanning apparatus according to claim 13, wherein said facing portion is a side wall of said casing.

23. An optical scanning apparatus according to claim 13, wherein said facing portion is a reinforcing rib configured to reinforce said casing.

24. An image forming apparatus comprising:
a photosensitive member;
an optical scanning apparatus, according to claim 13, configured to form a latent image on said photosensitive member;
a developing portion configured to develop, with toner, the latent image formed by said optical scanning apparatus thereby to form a toner image; and
a transfer portion configured to transfer the toner image, formed by said developing portion, onto a toner image receiving member.

* * * * *